US008369527B2

(12) United States Patent
Carmeli et al.

(10) Patent No.: US 8,369,527 B2
(45) Date of Patent: Feb. 5, 2013

(54) ACCESS CONTROL OVER MULTICAST

(75) Inventors: Boaz Carmeli, Korani (IL); John Justin Duigenan, Dorset (GB); Michael Damein Elder, Durham, NC (US); Gidon Gershinsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 11/571,161

(22) PCT Filed: Jun. 22, 2005

(86) PCT No.: PCT/EP2005/052924
§ 371 (c)(1),
(2), (4) Date: Oct. 1, 2007

(87) PCT Pub. No.: WO2006/000566
PCT Pub. Date: Jan. 5, 2006

(65) Prior Publication Data
US 2008/0107272 A1 May 8, 2008

(30) Foreign Application Priority Data

Jun. 24, 2004 (GB) .................................. 0414253.5
Jun. 24, 2004 (GB) .................................. 0414254.3

(51) Int. Cl.
*H04L 29/06* (2006.01)
(52) U.S. Cl. ........ 380/278; 380/277; 380/279; 380/280; 380/281; 380/282; 380/283; 380/284; 380/285; 380/286; 713/160; 713/161; 713/162; 713/163; 709/226; 709/227; 709/228; 709/229

(58) Field of Classification Search .......... 713/160–163; 709/226–229; 380/277–286
See application file for complete search history.

(56) References Cited

U.S. PATENT DOCUMENTS 6,049,878 A    4/2000  Caronni et al.
(Continued)

FOREIGN PATENT DOCUMENTS

EP    0622922 A1    4/1993
JP    09097295 A    4/1997
(Continued)

OTHER PUBLICATIONS

Marina V. Blanton, Key Management in Hierarchical Access Cotrol System, Aug. 2007, Purdue University.*

(Continued)

*Primary Examiner* — Taghi Arani
*Assistant Examiner* — Josnel Jeudy
(74) *Attorney, Agent, or Firm* — Law Office of Jim Boice

(57) ABSTRACT

A multicast host for communicating information published about any one of a set of topics to one or more authorised subscribers to those topics, the set of topics being partitioned into one or more partition elements, each partition element having a partition element encryption key associated therewith, wherein each of the one or more partition elements is a disjoint proper subset of the set of topics, the host comprising: means for receiving information relating to a topic; means for determining a partition element for the topic; means for retrieving a partition element encryption key associated with the partition element; means for encrypting the information with the retrieved partition element encryption key; and means for communicating the information to the one or more authorised subscribers.

61 Claims, 15 Drawing Sheets

U.S. PATENT DOCUMENTS

| | | | |
|---|---|---|---|
| 6,240,188 B1 * | 5/2001 | Dondeti et al. | 380/284 |
| 7,107,463 B2 * | 9/2006 | England et al. | 713/193 |
| 7,434,046 B1 * | 10/2008 | Srivastava | 713/163 |
| 2002/0059526 A1 * | 5/2002 | Dillon et al. | 713/201 |
| 2002/0104001 A1 * | 8/2002 | Lotspiech et al. | 713/163 |
| 2005/0086469 A1 * | 4/2005 | Dunagan et al. | 713/163 |
| 2010/0246827 A1 * | 9/2010 | Lauter et al. | 380/278 |

FOREIGN PATENT DOCUMENTS

| | | |
|---|---|---|
| JP | 2002247022 A | 8/2002 |
| JP | 2002329012 A | 11/2002 |
| WO | WO2004045149 A1 | 5/2004 |

OTHER PUBLICATIONS

Wong et al., "Secure Group Communications Using Key Graphs", IEEE/ACM Transactions on Networking vol. 8, No. 1, Feb. 2000.

European Patent Office, Examination Report for EP Application No. 05 766 820.4-1244, Prepared by Primary Examiner, pp. 1-5, October 17, 2012.

* cited by examiner

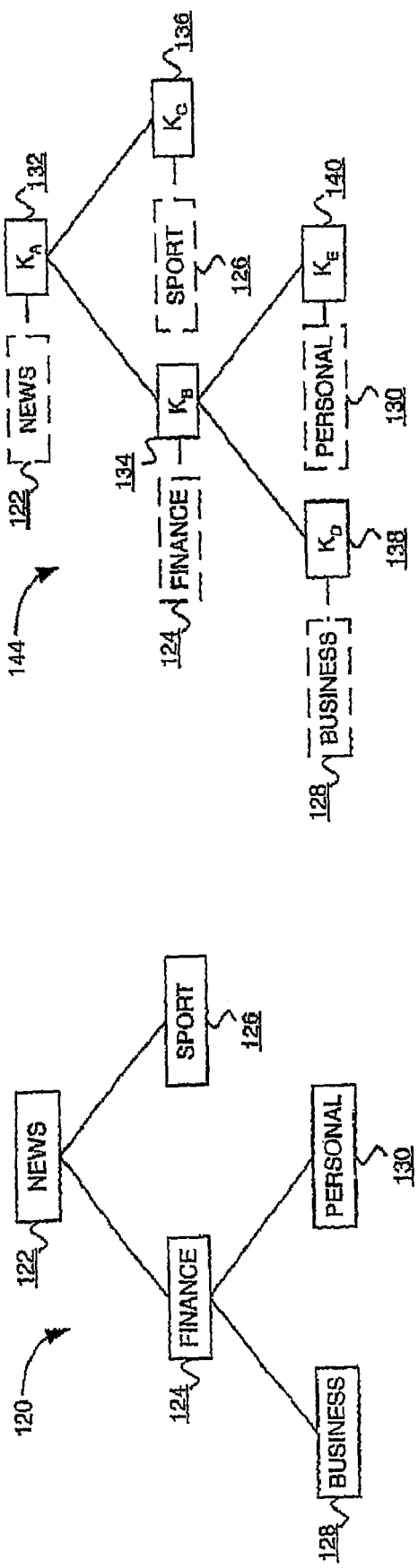

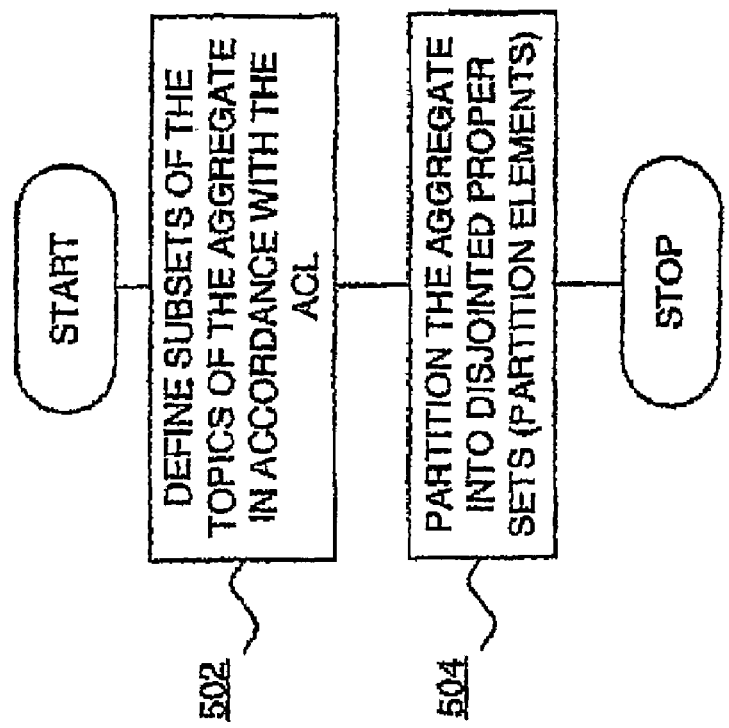
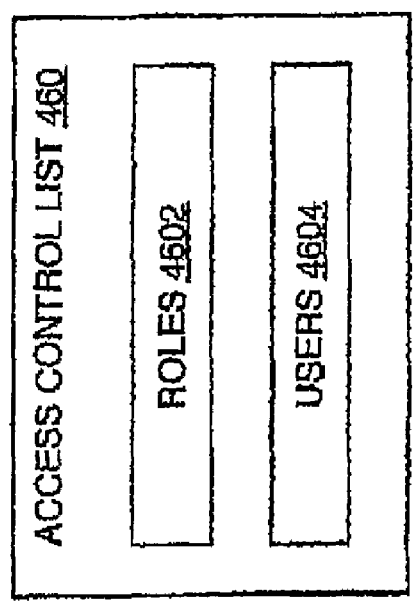

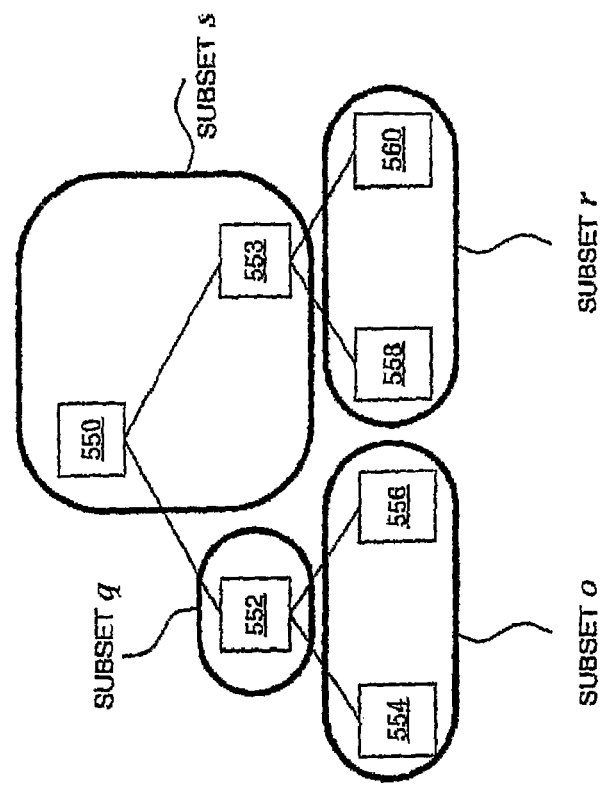
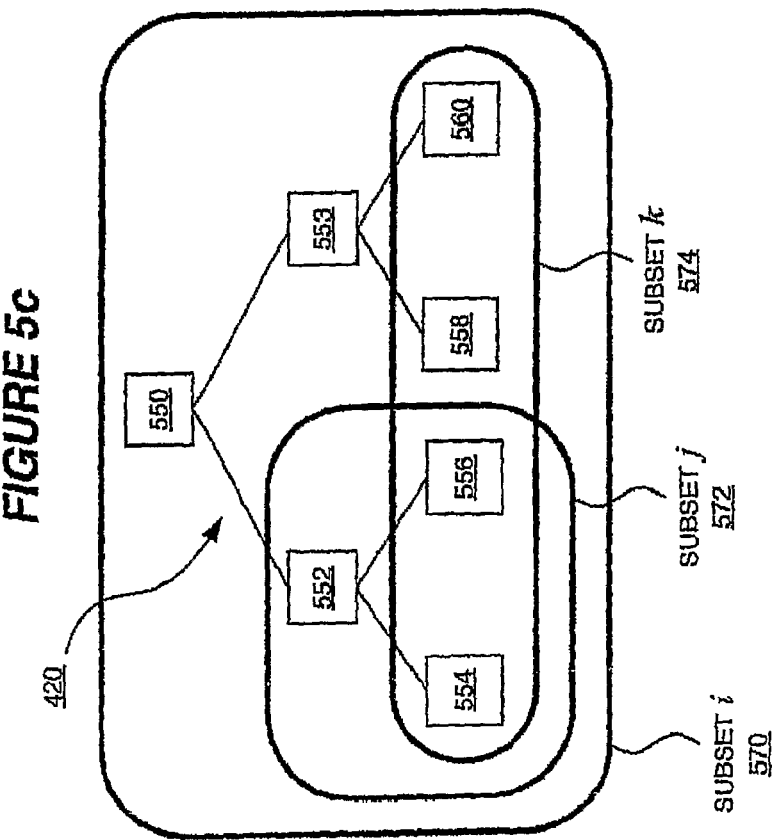

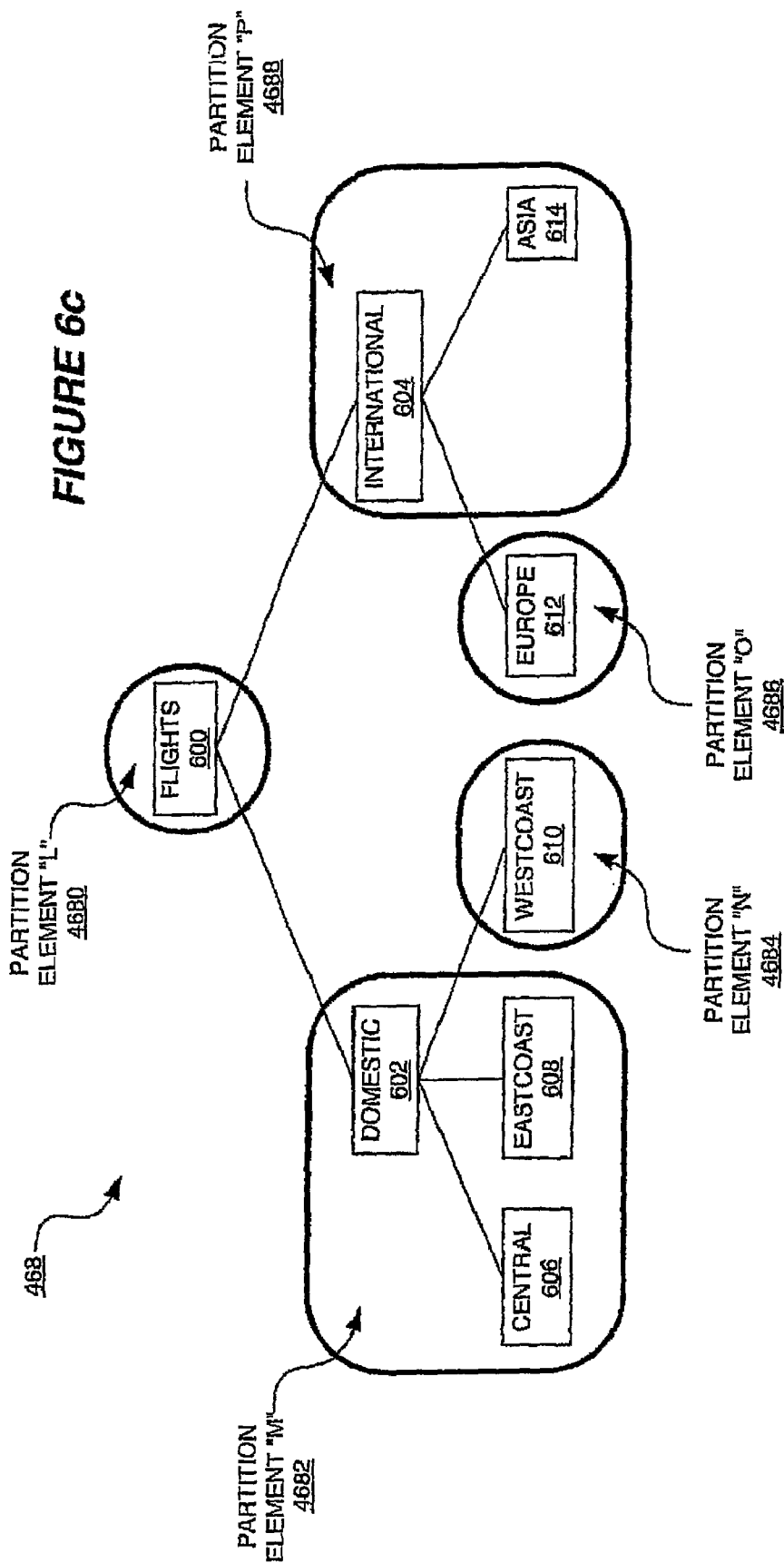

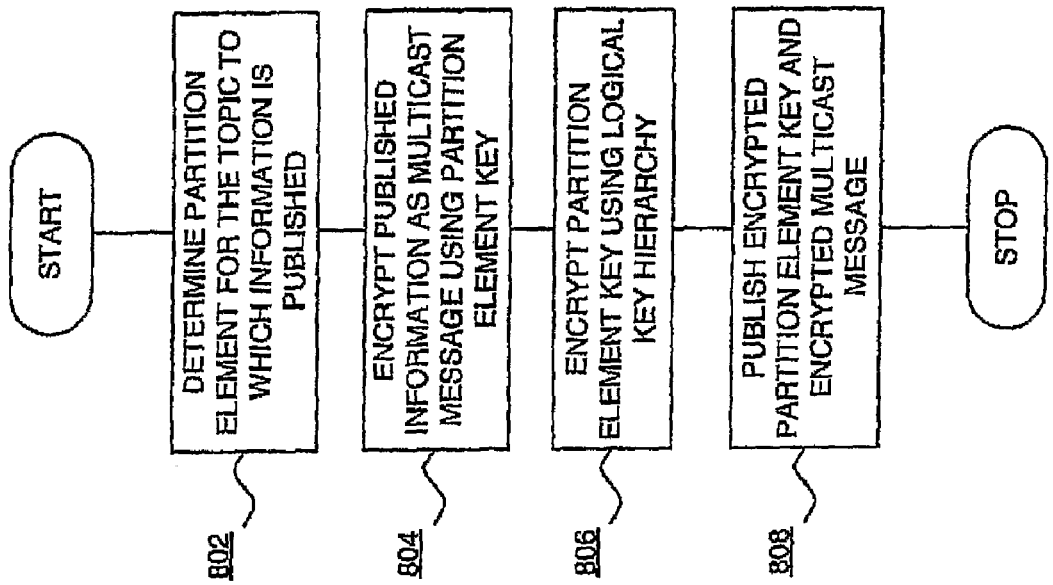

ACCESS CONTROL OVER MULTICAST

TECHNICAL FIELD

This invention relates to providing access control for published information. In particular it relates to access control in a multicast publish/subscribe system.

BACKGROUND ART

In publish/subscribe systems information can be organised as an hierarchy of topics known as an hierarchical information aggregate. A user is able to subscribe to receive information published to one or more of the topics. When information is published to a topic in the information aggregate an information provider securely communicates the information as a message to a set of users in such a way that only a subset of the users who are subscribed to the topic are able to access the message. To ensure the message is communicated securely and can only be accessed by subscribed users it is necessary for the information provider to encrypt the message using a key based encryption method such as public/private key encryption.

One way to ensure published information is only accessible to subscribed users is to use an unicast publish/subscribe system. In an unicast system an information provider determines a set of users subscribed to a topic to which information is published. For each subscribed user a communications channel between the information provider and the subscribed user is used to communicate the published information as a message to the subscribed user. The communications channel is secured using a key for the subscribed user and a separate communications channel exists for each subscribed user. In this way published information is securely delivered to each subscribed user using separate communications channels so ensuring only subscribed users receive and can access the published information. Unicast publish/subscribe systems have the disadvantage that a communications channel must exist for each subscribed user and that published information must be communicated separately for each user.

An alternative to an unicast publish/subscribe system is a multicast publish/subscribe system which does not include a separate communications channel for each user. In a multicast system published information is communicated as a message to subscribed users over a communications channel which is common to multiple users, potentially including users which are not subscribed. To ensure the message is accessible only to subscribed users it is encrypted once for each subscribed user using a key specific to the user. Once encrypted for a subscribed user, the message is communicated over the common communications channel. Only the user for which the message was encrypted is able to access the published information using the user's specific key. Such a multicast publish/subscribe system has the disadvantage that a message containing published information must be encrypted and securely communicated once for each subscribed user. This is resource intensive especially where there are many subscribed users.

The paper "Secure Group Communications Using Key Graphs" (Wong et al, IEEE/ACM Transactions on Networking, Vol. 8, No. 1, February 2000 pp. 16-30) discloses a technique to partially alleviate these problems by using a hierarchy of keys, known as a logical key hierarchy. Wong et al. describe representing users in a multicast audience as leaf nodes in a logical tree. Each node contains a key and each user has knowledge of every key in the path from its leaf to the root of the tree. When information is published an information provider communicates the information as a message over a multicast communications channel. Prior to communication, the message is encrypted using a random key, $K_r$. An information provider then determines a set of keys which can be used to encrypt the random key $K_r$, where the set of keys corresponds to a set of subscribed users. Thus, the message is encrypted only once using the random key $K_r$, whilst the random key is itself encrypted multiple times using the set of keys corresponding to the subscribed users. Where all users in a branch of the logical tree are subscribers of the published information the key for the node representing the branch in the tree can be used to encrypt the random key $K_r$. In this way it is not necessary to encrypt the random key $K_r$ using an individual key for each subscribed user. The logical key hierarchy approach described by Wong et al. therefore alleviates the problems with secure publish/subscribe distribution over a multicast communications channel by removing the need to encrypt a published information message more than once, and by reducing the set of keys required to accommodate a set of subscribed users.

While the logical key hierarchy approach is effective for simple published information structures, it has the drawback that it requires the generation of a random key $K_r$ for each published information message. In a high volume system with frequent publication of information the repeated generation of random keys can be resource intensive. This is particularly pertinent to hierarchical information aggregates where users can have very fine grained subscriptions to particular and detailed topics in the information aggregate and the number of published information messages can be high. For example, a user may have specific subscription interests which may be very unlike other users, such as a stock quote system where each user subscribes to topics in an hierarchical information aggregate corresponding to stock quote information for particular stocks in a portfolio.

It would therefore be advantageous to securely communicate published information over a multicast communications channel without the need to generate a random key for each published information message for information published in an hierarchical information aggregate.

DISCLOSURE OF INVENTION

The present invention accordingly provides, in a first aspect, a multicast host for communicating information published about any one of a set of topics to one or more authorised subscribers to those topics, the set of topics being partitioned into one or more partition elements, each partition element having a partition element encryption key associated therewith, wherein each of the one or more partition elements is a disjoint proper subset of the set of topics, the host comprising: means for receiving information relating to a topic; means for determining a partition element for the topic; means for retrieving a partition element encryption key associated with the partition element; means for encrypting the information with the retrieved partition element encryption key; and means for communicating the information to the one or more authorised subscribers.

Thus the present invention provides the advantage that information published to a topic is encrypted using the topic key without the need for the generation of a random key for the multicast message. The topic key for a topic is distributed so that only users subscribed to the topic can access the topic key.

Preferably each disjoint proper subset of the set of topics is defined in accordance with an access control list.

Preferably the access control list includes a definition of a plurality of roles.

Preferably each of the plurality of roles is a subset of the set of topics.

Preferably each disjoint proper subset of the set of topics is defined to be one of a set difference and an intersect of the plurality of roles.

Preferably the multicast host further comprises means for securely communicating the partition element encryption key to the one or more subscribers.

Preferably the partition element encryption key is securely communicated by encrypting the partition element encryption key.

Preferably the partition element encryption key is encrypted using a logical key hierarchy in which a logical key corresponds to the one or more authorised subscribers.

Preferably the multicast host further comprises means for securely communicating a partition element decryption key to the one or more authorised subscribers, wherein the partition element decryption key corresponds to the partition element encryption key.

Preferably the partition element decryption key is securely communicated by encrypting the partition element decryption key.

Preferably the partition element decryption key is encrypted using a logical key hierarchy in which a logical key corresponds to the one or more authorised subscribers.

Preferably the multicast host further comprises means for receiving a new subscription to a topic in a partition element; and means for generating a new partition element encryption key for a partition element.

Preferably the multicast host further comprises means for generating a new partition element decryption key corresponding to the new partition element encryption key.

Preferably the multicast host further comprises means for receiving a cancelled subscription to a topic in a partition element; and means for generating a new partition element encryption key for a partition element.

Preferably the multicast host further comprises means for generating a new partition element decryption key corresponding to the new partition element encryption key.

The present invention accordingly provides, in a second aspect, multicast system comprising: a multicast host according to the first aspect; and one or more multicast subscribers for receiving information communicated by the multicast host.

The present invention accordingly provides, in a third aspect, a method for communicating information published about any one of a set of topics to one or more authorised subscribers to those topics, the set of topics being partitioned into one or more partition elements, each partition element having a partition element encryption key associated therewith, wherein each of the one or more partition elements is a disjoint proper subset of the set of topics, the host comprising: receiving information relating to a topic; determining a partition element for the topic; retrieving a partition element encryption key associated with the partition element; encrypting the information with the retrieved partition element encryption key; and communicating the information to the one or more authorised subscribers.

The present invention accordingly provides, in a fourth aspect, a computer program product comprising computer program code stored on a computer readable storage medium which, when executed on a data processing system, instructs the data processing system to carry out the method described above in the third aspect.

The present invention accordingly provides, in a fifth aspect, a computer program product stored on a computer usable medium, the computer program product for communicating information published about any one of a set of topics to one or more authorised subscribers to those topics, the set of topics being partitioned into one or more partition elements, each partition element having a partition element encryption key associated therewith, wherein each of the one or more partition elements is a disjoint proper subset of the set of topics, the computer program product comprising: computer readable program means for receiving information relating to a topic; computer readable program means for determining a partition element for the topic; computer readable program means for retrieving a partition element encryption key associated with the partition element; computer readable program means for encrypting the information with the retrieved partition element encryption key; and computer readable program means for communicating the information to the one or more authorised subscribers.

BRIEF DESCRIPTION OF THE DRAWINGS

Preferred embodiments of the present invention will now be described in detail by way of example only with reference to the following drawings:

FIG. 1b is an illustrative example of the hierarchical information aggregate of FIG. 1a in accordance with a preferred embodiment of the present invention;

FIG. 1c is an illustrative example of the topic key hierarchy of FIG. 1a in accordance with a preferred embodiment of the present invention;

FIG. 4b is an illustration of the access control list of FIG. 4 in accordance with a preferred embodiment of the present invention;

FIG. 5a is a flowchart of a method for defining the partition elements of FIG. 4a in accordance with a preferred embodiment of the present invention;

FIG. 5c is an illustrative example of the hierarchical information aggregate of FIG. 4a, including a definition of subsets of the hierarchical information aggregate, in accordance with a preferred embodiment of the present invention;

FIG. 5d illustrates disjoint proper subsets generated using the method of FIG. 5b for the hierarchical information aggregate of FIG. 5c in accordance with a preferred embodiment of the present invention;

FIG. 6c is an illustrative example of the partition elements of FIG. 4a in accordance with a preferred embodiment of the present invention;

FIG. 7b is an illustrative example of a user which is associated with key F11 in the logical key hierarchy of FIG. 4a by way of an indicator of FIG. 7a;

FIG. 7c is an illustrative example of a user which is associated with key F121 in the logical key hierarchy of FIG. 4a by way of an indicator of FIG. 7a;

FIG. 7d is an illustrative example of a user which is associated with key F122 in the logical key hierarchy of FIG. 4a by way of an indicator of FIG. 7a;

FIG. 7e is an illustrative example of a user which is associated with key F2 in the logical key hierarchy of FIG. 4a by way of an indicator of FIG. 7a;

FIG. 8 is a flow chart illustrating a method for publishing information in a multicast system in accordance with a preferred embodiment of the present invention.

MODE FOR THE INVENTION

Figure 1A:
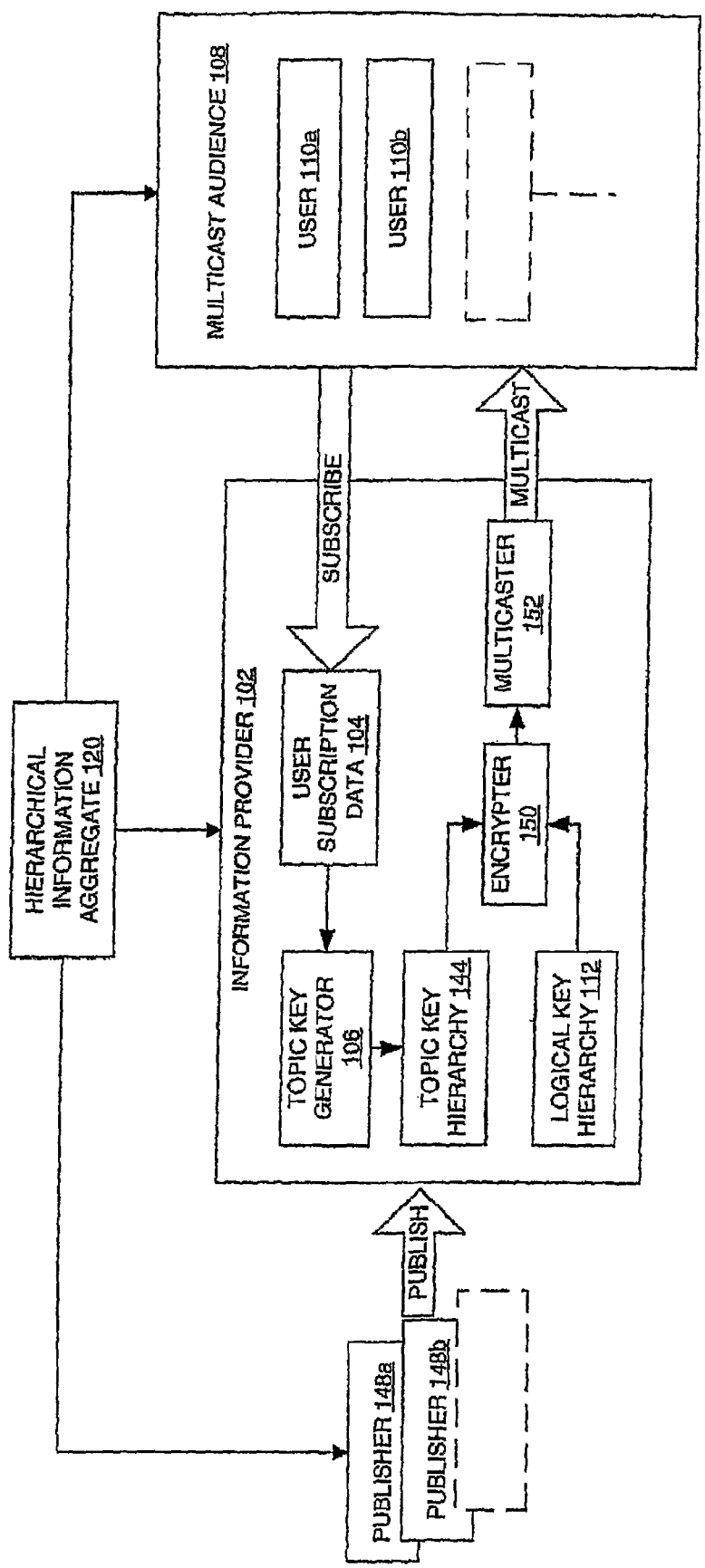
FIG. 1a is a schematic illustration of a multicast publish/subscribe system including a multicast information provider in accordance with a preferred embodiment of the present invention.

FIG. 1a is a schematic illustration of a multicast publish/subscribe system including a multicast information provider 102. In the multicast publish/subscribe system publishers 148a and 148b are hardware or software implementations of devices or entities which publish information to topics in an hierarchical information aggregate 120. The hierarchical information aggregate 120 is a logical structure of topics arranged hierarchically to which information can be published and is considered in detail below with respect to FIG. 1b. Information published by the publishers 148a and 148b is communicated to the information provider 102 over a communications channel between the publishers 148a and 148b. Examples of such communications channels include wired or wireless computer networks, although it will be appreciated by those skilled in the art that any communications channel between the publishers 148a and 148b and the information provider 102 can be used.

The information provider 102 is a hardware or software implementation of a device or entity which receives published information from publishers 148a and 148b. The information provider includes a multicaster 152 which is a hardware or software device or entity for communicating published information to a multicast audience 108 as multicast messages. A multicast message is a message that is sent to multiple devices or users on a network and is well known in the art. For example, multicaster 152 is a software application configured to send multicast messages to the multicast audience 108. The multicast audience 108 is a collection of users 110a and 110b. Users 110a and 110b are hardware or software implementations of devices or entities configured to receive multicast messages which correspond to published information from the information provider 102. For example, the information provider 102 can be a computer system communicatively connected to the multicast audience 108 and the published information can be data, such as binary data. An example of a connection between the information provider 102 and the multicast audience 108 is a computer network. The users 110a and 110b are able to subscribe to one or more topics in the hierarchical information aggregate 120 by communicating a subscription request to the information provider 102. The information provider 102 includes user subscription data 104 which stores information regarding subscriptions of users 110a and 110b to topics within the hierarchical information aggregate 120. For example, if user 110a is subscribed to a particular topic in the hierarchical information aggregate 120, this subscription is recorded in the user subscription data 104 including an identification of the user and an identification of the topic. The user subscription data 104 can be recorded in a database. Alternatively, the user subscription data 104 can be recorded in a memory of a computer system or as a file on a storage device of a computer system. It will be appreciated by those skilled in the art that other suitable means for storing the user subscription data 104 may be employed.

The information provider 102 further includes a topic key generator 106, a topic key hierarchy 144, a logical key hierarchy 112 and an encrypter 150. The topic key generator is a hardware or software device or entity for generating encryption keys, such as public keys and private keys required for public/private key encryption as is well known in the art. An example of a topic key generator 106 is the "Pretty Good Privacy" (PGP) product (Pretty Good Privacy and PGP are registered trademarks of PGP Corporation). The topic key generator 106 generates keys for each of the topics of the hierarchical information aggregate 120 and stores them in the topic key hierarchy 144. The topic key hierarchy 144 is considered in detail below with respect to FIG. 1c. The logical key hierarchy 112 is a logical tree structure of keys as is known in the art and is considered in detail below with reference to FIG. 1d. The encrypter 150 is a hardware or software device or entity for generating an encrypted version of a data item using one or more encryption keys. For example, the encrypter 150 can use a public encryption key to encrypt an item of data. An example of an encrypter 150 is the "Pretty Good Privacy" (PGP) product.

In FIG. 1a the multicast audience 108 is illustrated as having two users, although it will be apparent to those skilled in the art that any number of users could constitute the multicast audience 108. Similarly, whilst only two publishers 148a and 148b are illustrated, it will be apparent to those skilled in the art that any number of publishers could publish information in such a multicast publish/subscribe system.

FIG. 1b is an illustrative example of the hierarchical information aggregate 120 of FIG. 1a. The hierarchical information aggregate 120 is stored in a storage or memory of a device (not illustrated) and is accessible to each of the publishers 148a, 148b, the information provider 102 and the users 110a and 110b in the multicast audience 108. Alternatively the hierarchical information aggregate 120 may be stored in a storage or memory of any one or more of the publishers 148a, 148b, the information provider 102 or the users 110a and 110b in the multicast audience 108, whilst being accessible to each of these devices or entities. The hierarchical information aggregate 120 comprises topic "NEWS" 122, topic "FINANCE" 124, topic "SPORT" 126, topic "BUSINESS" 128 and topic "PERSONAL" 130 arranged hierarchically such that topic "NEWS" 122 is a root topic in the hierarchy. The topics "FINANCE" 124 and "SPORT" 126 descend from topic "NEWS" 122, and the topics "BUSINESS" 128 and "PERSONAL" 130 descend from topic "FINANCE" 124. Each of the topics is a category to which information can be published by the publishers 148a and 148b. Users 110a and 110b are able to subscribe to access information published to one or more particular topics. For example, user 110a can subscribe to access information published to "NEWS/FINANCE". The notation '/' is used to indicate a path in the hierarchical information aggregate 120 from a root topic in the hierarchy in order to uniquely identify a particular topic in the hierarchy. Thus, "NEWS/FINANCE" uniquely identifies topic "FINANCE" 124 in the hierarchy. For example, if user 110a is subscribed to access information published to "NEWS/FINANCE", the user 110a is able to access any information published by the information provider 102 to the topic "FINANCE" 124. Similarly a user can subscribe to a branch of the hierarchical information aggregate 120 using a wildcard. For example, user 110b can subscribe to access information published to "NEWS/FINANCE/#", where the notation '#' is used to indicate a wildcard subscription to all topics descending from the topic "FINANCE" 124. Thus, if user 110b subscribes to "NEWS/FINANCE/#" the user 110b is able to access any information published to any of the topics "FINANCE" 124, "BUSINESS" 128 and "PERSONAL" 130. The hierarchical information aggregate 120 is illustrated as having five topics, although it will be apparent to those skilled in the art that any number of topics could constitute the hierarchical information aggregate 120.

FIG. 1c is an illustrative example of the topic key hierarchy 144 of FIG. 1a. The topic key hierarchy 144 includes a topic key for association with each of the topics 122 to 130 in the hierarchical information aggregate 120. A topic key $K_A$ 132 is associated with the topic "NEWS" 122. A topic key $K_B$ 134 is associated with the topic "FINANCE" 124 and so on. The topic keys $K_A$ 132, $K_B$ 134, $K_C$ 136, $K_D$ 138 and $K_E$ 140 are encryption keys generated by the topic key generator 106. For example, where the topic key generator 106 is a public/private key generator, the topic keys 144 include a public key and a private key for each topic in the hierarchical information aggregate 120. Information published to a topic in the hierarchical information aggregate 120 is encrypted by the encrypter 150 of the information provider 102 using a topic key associated with the topic. Whilst the topic key hierarchy 144 is illustrated as residing within the information provider 102 and being separate from the hierarchical information aggregate 120 it will be appreciated by those skilled in the art that the topic key hierarchy 144 can be integrated into the hierarchical information aggregate 120 and can be stored remotely from the information provider 102. For example, the hierarchical information aggregate 120 can include a hierarchy of topics with a topic key associated with each topic within the hierarchy.

Figure 1E:
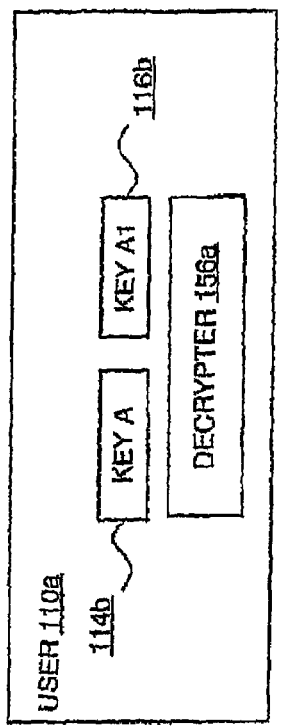
FIG. 1e is an illustrative example of a user which is associated with key A1 in the logical key hierarchy of FIG. 1a by way of an indicator of FIG. 1d.
Figure 1F:
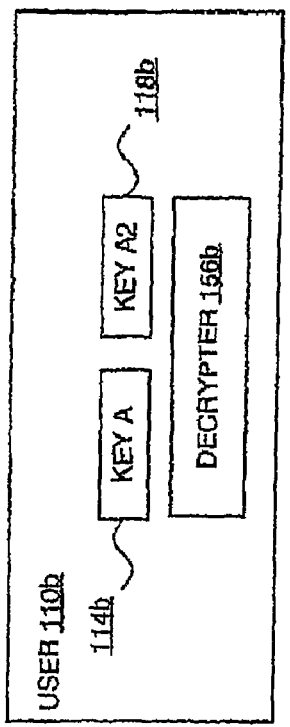
FIG. 1f is an illustrative example of a user which is associated with key A2 in the logical key hierarchy by way of an indicator of FIG. 1d.
Figure 1D:
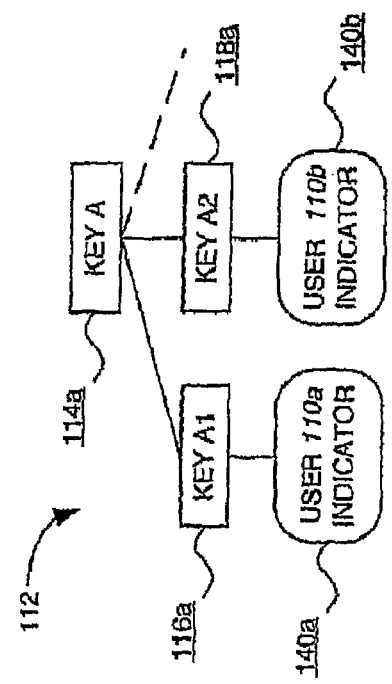
FIG. 1d is an illustrative example of the logical key hierarchy 112 of FIG. 1a as is known in the art.

FIG. 1d is an illustrative example of the logical key hierarchy 112 of FIG. 1a as is known in the art. Logical key hierarchies are described in detail in the paper "Secure Group Communications Using Key Graphs" (Wong et al, IEEE/ACM Transactions on Networking, Vol. 8, No. 1, February 2000 pp. 16-30). The logical key hierarchy 112 is a logical tree structure of encryption keys A 114a, A1 116a and A2 118a. In the logical key hierarchy 112 an indication for each of the users 110a and 110b of the multicast audience 108 is associated with a 'leaf' key in the logical tree structure. That is to say an indicator 140a for user 110a is associated with key A1 116a at a leaf of the logical key hierarchy 112. Similarly, an indicator 140b for user 110b is associated with key A2 118a at a leaf of the logical key hierarchy 112. All users in the multicast audience 108 will be associated with leaf keys in the logical key hierarchy 112 in this way. The arrangement of keys in the logical key hierarchy 112 is configured for a particular multicast audience 108 to accommodate a most effective or efficient distribution of keys about the multicast audience 108 for a particular multicast distribution system as is known in the art and from Wong et al. Particular methods and considerations for the design of the logical key hierarchy 112 are outside the scope of this description and will not be included here.

Each of the users 110a and 110b has access to keys corresponding to each of the keys in the path from the user's associated leaf key to the root of the logical key hierarchy 112. Considering first user 110a, FIG. 1e is an illustrative example of user 110a which is associated with key A1 116a in the logical key hierarchy 112 by way of the indicator 140a of FIG. 1d. User 110a has access to keys corresponding to each of keys A1 116a and A 114a because these keys are in the path from its associated leaf key to the root. User 110a therefore has access to key A1 116b which corresponds to key A1 116a in the logical key hierarchy 112. User 110a also therefore has access to key A 114b which corresponds to key A 114a in the logical key hierarchy 112. Keys A1 116b and A 114b can be copies of the corresponding keys A1 116a and A 114a. Alternatively, public/private key encryption can be employed where keys A1 116b and A 114b are private keys for decryption and keys A1 116a and A 114a are public keys for encryption. User 110a also includes a decrypter 156a which is a hardware or software device or entity for generating a decrypted version of an encrypter data item using one or more decryption keys. For example, the decrypter 156a can use a private decryption key such as key A1 116b to decrypt an item of data. An example of a decrypter 156a is the "Pretty Good Privacy" (PGP) product. Considering now user 110b, FIG. 1f is an illustrative example of user 110b which is associated with key A2 118a in the logical key hierarchy 112 by way of the indicator 140b of FIG. 1d. User 110b has access to keys corresponding to each of keys A2 118a and A 114a because these keys are in the path from its associated leaf key to the root. Therefore, user 110b has access to key A2 118b which corresponds to key A2 118a in the logical key hierarchy 112. User 110b also therefore has access to key A 114b which corresponds to key A 114a in the logical key hierarchy 112. Keys A2 118b and A 114b can be copies of the corresponding keys A2 118a and A 114a. Alternatively, public/private key encryption can be employed where keys A2 118b and A 114b are private keys for decryption and keys A2 118a and A 114a are public keys for encryption. User 110a also includes a decrypter 156b which is equivalent to the decrypter 156a of user 110a. It should be noted that in this example both users 110a and 110b have access to key A 114b corresponding to key A 114a in the logical key hierarchy. Thus, data encrypted by the information provider 102 using Key A 114a can be decrypted by both users 110a and 110b.

The logical key hierarchy 112 is illustrated as having three keys, although it will be apparent to those skilled in the art that any number of keys can be organised in a logical key hierarchy 112.

Figure 2:
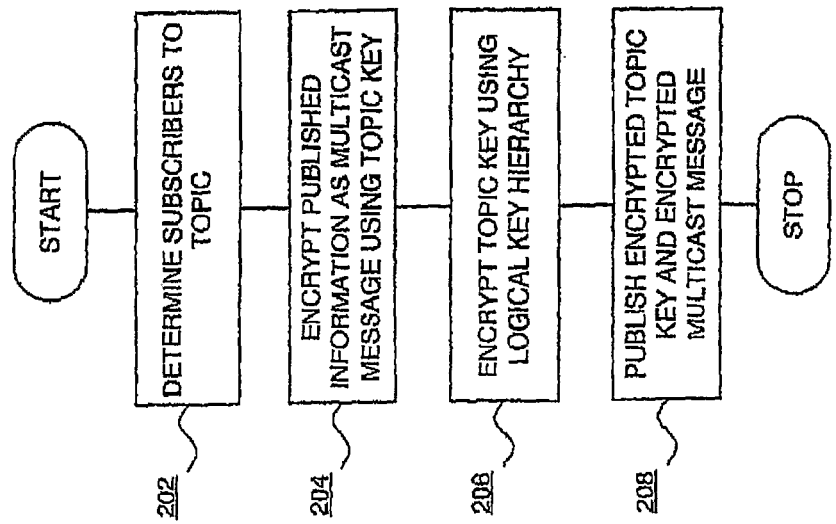
FIG. 2 is a flow chart illustrating a method for publishing information in a multicast system in accordance with a preferred embodiment of the present invention.

FIG. 2 is a flow chart illustrating a method for publishing information in a multicast system. When one of the publishers 148a and 148b publishes information to a topic of the hierarchical information aggregate 120, the information provider 102 employs the method of FIG. 2 to multicast the information as a multicast message to the multicast audience 108. Initially at step 202 the information provider 102 determines a subset of all users in the multicast audience 108 which are subscribed to the topic to which information is published. This determination is made with reference to the user subscription data 104. Subsequently, at step 204, the published information is encrypted as a multicast message by the encrypter 150 using a topic key in the topic key hierarchy 144. The topic key used for the encryption is a key associated with the topic to which the published information is published in the hierarchical information aggregate 120. At step 206 the topic key is itself encrypted for the subscribed users using the logical key hierarchy 112. Thus, the topic key is encrypted one or more times using keys from the logical key hierarchy 112 so that only users subscribed to the topic to which the published information is published are able to decrypt the topic key, as is well known in the art. This technique is described in detail in Wong et al. Finally, at step 208, the encrypted topic key and the encrypted multicast message are communicated by the multicaster 152 to the multicast audience 108. In this way the published information is encrypted using a topic key for an appropriate topic without the need for the generation of a random key for the multicast message. Also, using this method the topic key is distributed to subscribed users so that only users subscribed to the topic to which information is published can access the multicast message.

In addition to the method of FIG. 2 for publishing information in a multicast system a topic key is generated in the topic key hierarchy 144 for each of the topics 122 to 130 in the hierarchical information aggregate 120. The generation of a topic key in the topic key hierarchy 144 can be undertaken when a topic is first defined in the hierarchical information aggregate. For example, a topic key can be generated when information is first published to a new topic by a publisher 148a or 148b. The generated topic key can then be encrypted one or more times using keys from the logical key hierarchy 114 and communicated to the multicast audience 108 along with a multicast message containing published information as described at step 208 of FIG. 2. Alternatively, the generated topic key can be encrypted using the logical key hierarchy 112 and communicated to the multicast audience 108 in a separate multicast message, such as a multicast message which does not contain published information. Thus the use of a random key for each multicast message is avoided.

Figure 3:
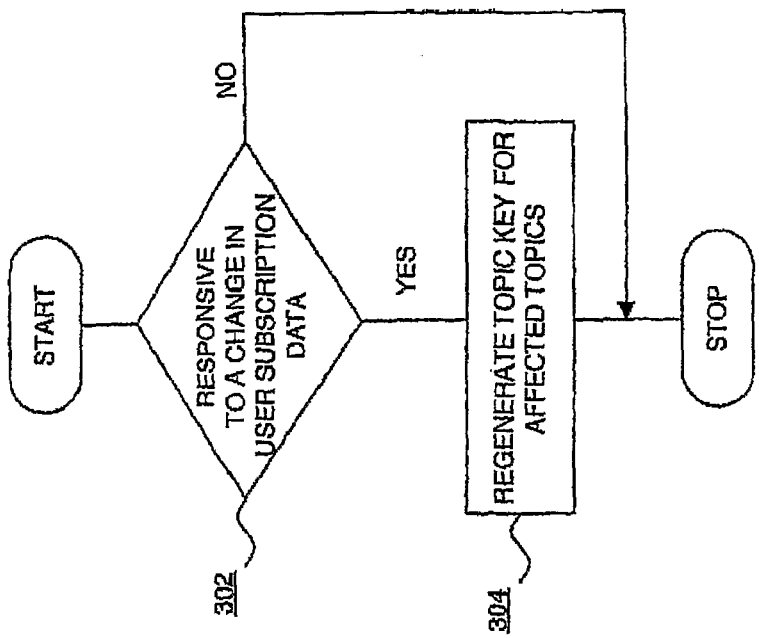
FIG. 3 is a flow chart illustrating a method for regenerating topic keys in accordance with a preferred embodiment of the present invention.

It is preferable to regenerate a topic key for a topic when the user subscription data 104 is updated to add or remove a subscribed user to the topic. A topic key is regenerated by discarding the topic key and generating a new topic key using the topic key generator 106. The regeneration of a topic key is preferable to prevent a newly subscribed user from decrypting previously transmitted multicast messages. Further, the regeneration of a topic key is preferable to prevent a newly unsubscribed user from continuing to decrypt future multicast messages. FIG. 3 is a flow chart illustrating a method for regenerating topic keys. The method is responsive to a change to the user subscription data 104 at step 302. In response to a change to user subscription data 104 for one or more topics in the hierarchical information aggregate 120, step 304 regenerates a topic key for each affected topic in the topic key hierarchy 144 using the topic key generator 106. In this way a topic key in the topic key hierarchy 144 is only regenerated when a new user subscribes to, or a subscribed user unsubscribes from, the corresponding topic.

The methods described above will now be considered in use, by way of example only, for a situation where user 110a subscribes to topic "PERSONAL" 130 in the hierarchical information aggregate 120. In order to subscribe to topic "PERSONAL" 130 the user 110a communicates a request to the information provider 102 for subscription to "NEWS/FINANCE/PERSONAL". This request results in a change to the user subscription data 104. Considering the method of FIG. 3 for regenerating topic keys, at step 302 the method responds to the addition of user 110a as a subscriber to topic "PERSONAL" 130 in the user subscription data 104. Subsequently at step 304 a new topic key $K_E$ 140 for topic "PERSONAL" 130 is generated using topic key generator 106. Thus, when the user subscription data 104 changes for topic "PERSONAL" 130 the topic key $K_E$ 140 is regenerated.

In a second example, user 110b communicates a request to the information provider 102 for subscription to "NEWS/FINANCE/#". This request results in a change to the user subscription data 104 to include user 110b as a subscriber to topics "FINANCE" 124, "BUSINESS" 128 and "PERSONAL" 130. Considering the method of FIG. 3 for regenerating topic keys, at step 302 the method responds to the addition of user 110b as a subscriber to topics "FINANCE" 124, "BUSINESS" 128 and "PERSONAL" 130 in the user subscription data 104. Subsequently at step 304 new topic keys are generated for the affected topics "FINANCE" 124, "BUSINESS" 128 and "PERSONAL" 130 in the topic key hierarchy 144. This results in the regeneration of topic keys $K_B$ 134, $K_D$ 138 and $K_E$ 140 using topic key generator 106. Thus, when the user 110b subscribes to "NEWS/FINANCE/#", subscription data 104 changes for topics "FINANCE" 124, "BUSINESS" 128 and "PERSONAL" 130, and the corresponding topic keys are regenerated.

The method of FIG. 2 will now be considered in use for the situation where user 110b is the only user subscribed to topic "FINANCE" 124 and information is published to topic "FINANCE" 124 by one of the publishers 148a or 148b. At step 202 the information provider 102 determines that user 110b is subscribed to topic "FINANCE" 124 with reference to the user subscription data 104. At step 204 the encrypter 150 encrypts information published to topic "FINANCE" 124 as a multicast message using the topic key $K_B$ 134 which corresponds to the topic "FINANCE" 124 in the topic key hierarchy 144. Subsequently, at step 206, the encrypter 150 encrypts the topic key $K_B$ 134 for the subscribed user 110b using the logical key hierarchy 112. This involves using key A2 118a in the logical key hierarchy 112 since this key corresponds to user 110b which is the only user subscribed to topic "FINANCE" 124 in the hierarchical information aggregate 120. Subsequently, at step 208, both the topic key $K_B$ 134 as encrypted using key A2 118a and the published information as encrypted using the topic key $K_B$ 134 are communicated as a multicast message by the multicaster 152. The multicast message is received by both users 110a and 110b in the multicast audience 108. In this way, user 110b receives the topic key $K_B$ 134 from the information provider 102. The user 110b is able to decrypt the topic key $K_B$ 134 as user 110b has access to key A2 118b which corresponds to key A2 118a with which the topic key $K_B$ 134 was encrypted. Once user 110b has decrypted the topic key $K_B$ 134, user 110b is able to decrypt the published information which was encrypted using the topic key $K_B$ 134. However, user 110a is unable to decrypt the topic key $K_B$ 134 because user 110a does not have access to a key corresponding to key A2 118a in the logical key hierarchy 112. User 110a is therefore unable to access the published information encrypted using the topic key $K_B$ 134. Thus the published information is only available to the subscribed user in the multicast audience 108, and the topic key $K_B$ 134 for topic "FINANCE" 124 does not need to be regenerated for each publication of information to topic "FINANCE" 124.

The method of FIG. 2 will now be further considered in use for the situation where both users 110a and 110b are subscribed to topic "PERSONAL" 130 and information is published to topic "PERSONAL" 130 by one of the publishers 148a or 148b. At step 202 the information provider 102 determines that both users 110a and 110b are subscribed to topic "PERSONAL" 130 with reference to the user subscription data 104. At step 204 the encrypter 150 encrypts the information published to topic "PERSONAL" 130 as a multicast message using the topic key $K_E$ 140 which corresponds to the topic "PERSONAL" 130 in the topic key hierarchy 144. Subsequently, at step 206, the encrypter 150 encrypts the topic key $K_E$ 140 for both of the subscribed users 110a and 110b using the logical key hierarchy 112. Since both users are subscribed to the topic "PERSONAL" 130 a key from the logical key hierarchy 112 which is commonly accessible to both users 110a and 110b is selected to encrypt the topic key $K_E$ 140. Key A 114b is commonly accessible to both users 110a and 110b, so corresponding key A 114a in the logical key hierarchy 112 can be used to encrypt the topic key $K_E$ 140. Subsequently, at step 208, both the topic key $K_E$ 140 as encrypted using key A 114a and the published information as encrypted using the topic key $K_E$ 140 are communicated as a multicast message by the multicaster 152. The multicast message is received by both users 110a and 110b in the multicast audience 108. The user 110a is able to decrypt the topic key $K_E$ 140 as user 110a has access to key A 114b which corresponds to key A 114a with which the topic key $K_E$ 140 was encrypted. Once user 110a has decrypted the topic key $K_E$ 140 user 110a is able to decrypt the published information which was encrypted using the topic key $K_E$ 140. Similarly, the user 110b is able to decrypt the topic key $K_E$ 140 as user 110b also has access to key A 114b which corresponds to key A 114a with which the topic key $K_E$ 140 was encrypted. Once user 110b has decrypted the topic key $K_E$ 140 user 110b is able to decrypt the published information which was encrypted using the topic key $K_E$ 140. Thus the published information is accessible by both subscribed users 110a and 110b in the multicast audience 108, and the topic key $K_E$ 140 for topic "PERSONAL" 130 does not need to be regenerated for each publication of information to topic "PERSONAL" 130. Also, the use of the logical key hierarchy 112 to encrypt the topic key $K_E$ 140 using the commonly accessible key A 114a renders is unnecessary to encrypt the topic key more than once.

In addition to individual users subscribing to topics in the hierarchical information aggregate, the information provider may include an access control list defining topics which users are authorised to access. In such a system published information is secured so that it is only accessible to authorised users (as opposed to subscribed users), and users are only able to subscribe to topics which they are authorised to access in accordance with the access control list. In such an arrangement the generation and maintenance of a key for each topic can become burdensome because users will be authorised to access a collection of topics in an hierarchical information aggregate. In principle it would be beneficial to partition the hierarchical information aggregate into groups of topics in accordance with an access control list, and maintain a key for each such group of topics. A preferred embodiment of the present invention will now be described.

Figure 4A:
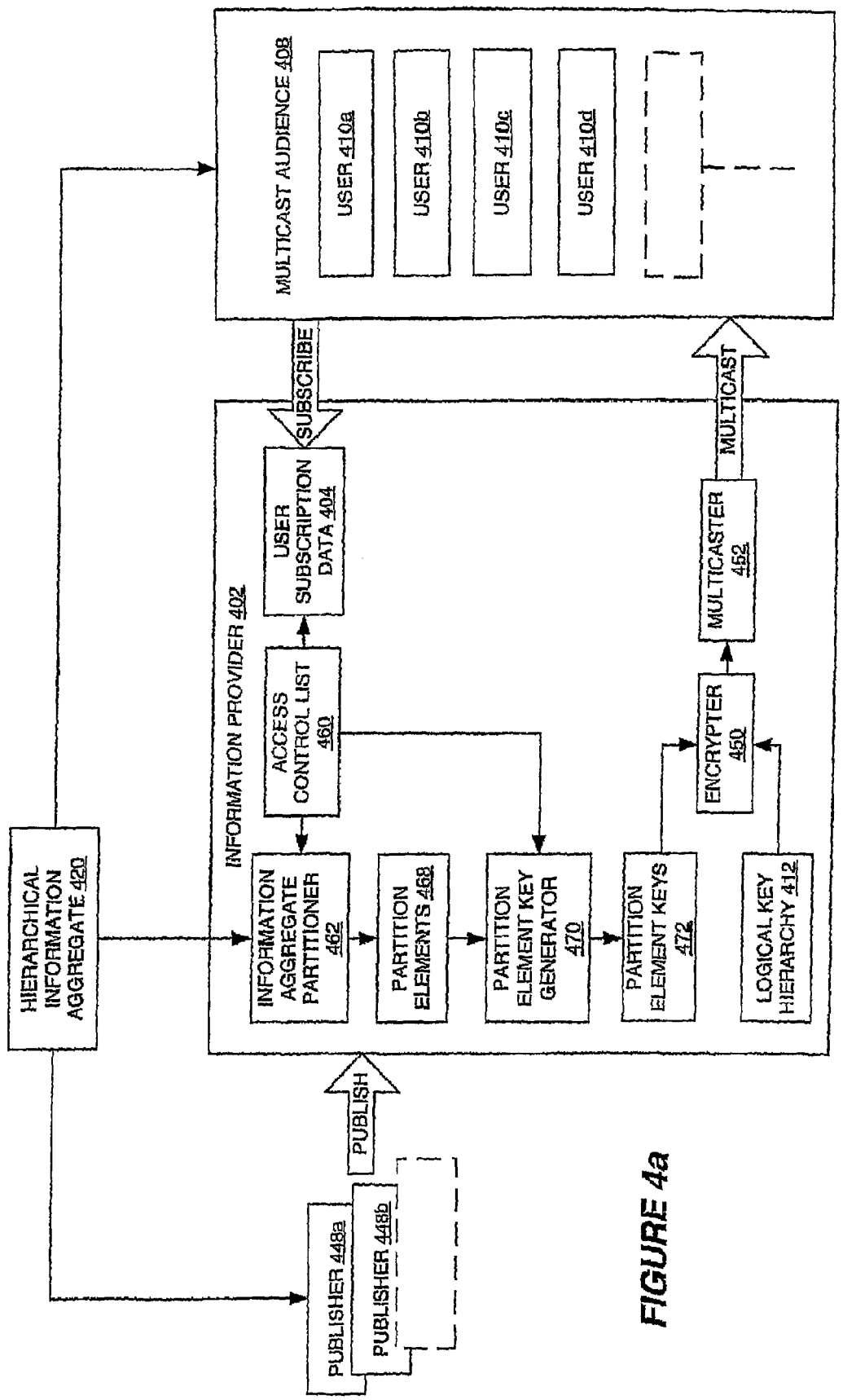
FIG. 4a is a schematic illustration of a multicast publish/subscribe system including a multicast information provider in accordance with a preferred embodiment of the present invention.

FIG. 4a is a schematic illustration of a multicast publish/subscribe system including a multicast information provider 402 in accordance with a preferred embodiment of the present invention. Many of the elements of FIG. 4a are identical to those described with respect to FIG. 1a and these will not be repeated here. The elements of FIG. 4a which are not common with FIG. 1a are described in detail below.

The information provider 402 includes an access control list 460 defining topics in the hierarchical information aggregate 420 which users in the multicast audience 408 are authorised to access. The access control list 460 can be recorded in a database. Alternatively, the access control list 460 can be recorded in a memory of a computer system or as a file on a storage device of a computer system. It will be appreciated by those skilled in the art that other suitable means for storing the access control list 460 may be employed. The information provider 402 can use the access control list 460 to ensure that user subscriptions defined in the user subscription data 404 are consistent with the authorisations defined in the access control list 460. This is desirable so that a user is not able to subscribe to a topic that the user is not authorised to access.

In one embodiment, the access control list 460 is defined as a list of topics or branches in the hierarchical information aggregate 420 which a particular user is authorised to access. An example of such an access control list 460 will now be described with reference to an exemplary hierarchical information aggregate 420 illustrated in FIG. 6a. The hierarchical information aggregate 420 of FIG. 6a includes a root topic "FLIGHTS" 600. Descending from the root topic are topics "DOMESTIC" 602 and "INTERNATIONAL" 604. Descending from topic "DOMESTIC" 602 are topics "CENTRAL" 606, "EASTCOAST" 608 and "WESTCOAST" 610. Descending from topic "INTERNATIONAL" 604 are topics "EUROPE" 612 and "ASIA" 614. Based on this exemplary hierarchical information aggregate 420, Table 1 below is an access control list 460 for users 410a to 410d in one embodiment. For each of the users 410a to 410d, Table 1 includes a definition of a set of topics. Each user is only authorised to access information published to topics in the set of topics for that user in the access control list 460. For example, user 410a is authorised to access information published to {FLIGHTS/DOMESTIC/#}. Thus, user 410a is authorised to access information published to any of the topics "DOMESTIC" 602, "CENTRAL" 606, "EASTCOAST" 608 and "WESTCOAST" 610 as these are the topics belonging to the set {FLIGHTS/DOMESTIC/#}.

TABLE 1

| Access Control List 460 | |
|---|---|
| USER | AUTHORISED TOPICS |
| User 410a | {FLIGHTS/DOMESTIC/#} |
| User 410b | {FLIGHTS/INTERNATIONAL/#, FLIGHTS/DOMESTIC/WESTCOAST} |
| User 410c | {FLIGHTS/DOMESTIC/#, FLIGHTS/INTERNATIONAL/EUROPE} |
| User 410d | {FLIGHTS/DOMESTIC/#} |

FIG. 4b illustrates an alternative embodiment of the access control list 460. The access control list of FIG. 4b includes roles 4602 and users 4604. Roles 4602 contains one or more named sets of topics or branches of the hierarchical information aggregate 420. Users 4604 contains an entry for each of users 410a to 410d and specifies, for each user, which of the roles 4602 the user is associated with. A user associated with a role is only authorised to access information published to topics in that role. An example of such an access control list 460 will now be described with reference to the hierarchical information aggregate 420 of FIG. 6a. Table 2a below is an example definition of the roles 4602 of FIG. 4b. Each row in Table 2a is a named set of topics of the hierarchical information aggregate 420.

TABLE 2a

Roles 4602

| ROLE NAME | AUTHORISED TOPICS |
|---|---|
| PACIFIC 622 | {FLIGHTS/INTERNATIONAL/#, FLIGHTS/DOMESTIC/WESTCOAST} |
| DOMESTIC 624 | {FLIGHTS/DOMESTIC/#} |
| DOMESTIC-EURO 626 | {FLIGHTS/DOMESTIC/#, FLIGHTS/INTERNATIONAL/EUROPE} |
| ALL 628 | {FLIGHTS/#} |

Thus, for example, the role "DOMESTIC" 624 includes the set of topics {FLIGHTS/DOMESTIC/#} in the hierarchical information aggregate 420. Thus, the role "DOMESTIC" 624 corresponds to the topics "DOMESTIC" 602, "CENTRAL" 606, "EASTCOAST" 608 and "WESTCOAST" 610. Table 2b below is an example definition of users 4604 of FIG. 4*b*. Each row in Table 2b corresponds to one of the users 410*a* to 410*d* of the multicast audience 408.

TABLE 2b

Users 4604

| USER | ROLE |
|---|---|
| User 410a | DOMESTIC 624 |
| User 410b | PACIFIC 622 |
| User 410c | DOMESTIC-EURO 626 |
| User 410d | DOMESTIC 624 |

Thus, for example, the user 410*a* is specified as belonging to the role "DOMESTIC" 624. The user 410*a* is therefore only authorised to access information published to topics included in the role "DOMESTIC" 624. As considered above, the role "DOMESTIC" 642 includes the set of topics {FLIGHTS/DOMESTIC/#}. Thus, user 410*a* is only authorised to access information published to the topics "DOMESTIC" 602, "CENTRAL" 606, "EASTCOAST" 608 and "WESTCOAST" 610.

In these ways it is possible to control individual user's access to information published to individual topics in the hierarchical information aggregate 420. Each of the two example embodiments of the access control list 460 described above includes a definition of sets of topics or branches to which information can be published that users are authorised to access. It will be appreciated by those skilled in the art that an access control list 460 could equally include a definition of sets of topics or branches to which information can be published that users are not authorised to access (i.e. exclusions to authorisation). Furthermore, while two example embodiments of the access control list 460 have been described above, it will be appreciated by those skilled in the art that any suitable mechanism for specifying access controls for users in the multicast audience 408 may be employed.

Returning now to FIG. 4*a*, the information provider 402 further includes an information aggregate partitioner 462. The information aggregate partitioner 462 partitions the hierarchical information aggregate 420 into one or more partition elements 468. Each of the partition elements 468 is defined mathematically as a disjoint proper subset of topics from the hierarchical information aggregate 420. Disjoint proper subsets are well known in set theory and can be defined, for an hierarchical information aggregate T, as a collection of sets, $S_1, S_2, S_3 \ldots S_n$ of the topics of T where, for any two sets, $S_i, S_j$:

$$(S_i \cap S_j = \hat{A}) \text{ and } (S_1 \cup S_2 \cup S_3 \ldots \cup S_n = T)$$

Thus no two of the sets $S_1, S_2, S_3 \ldots S_n$ intersect, and the union of all the sets is exactly equal to the whole hierarchical information aggregate T. The partition elements 468 are defined using the access control list 460 to partition the hierarchical information aggregate 420. Each of the partition elements 468 represents a building block of the access control list 460. For example, each of the roles 4602 can be defined in terms of a discrete list of partition elements. The purpose of the partition elements is to define an appropriate grouping of topics in the hierarchical information aggregate 420 so that encryption keys can be assigned to groups of topics so avoiding any need to generate a key for every topic in the hierarchy.

Figure 5B:
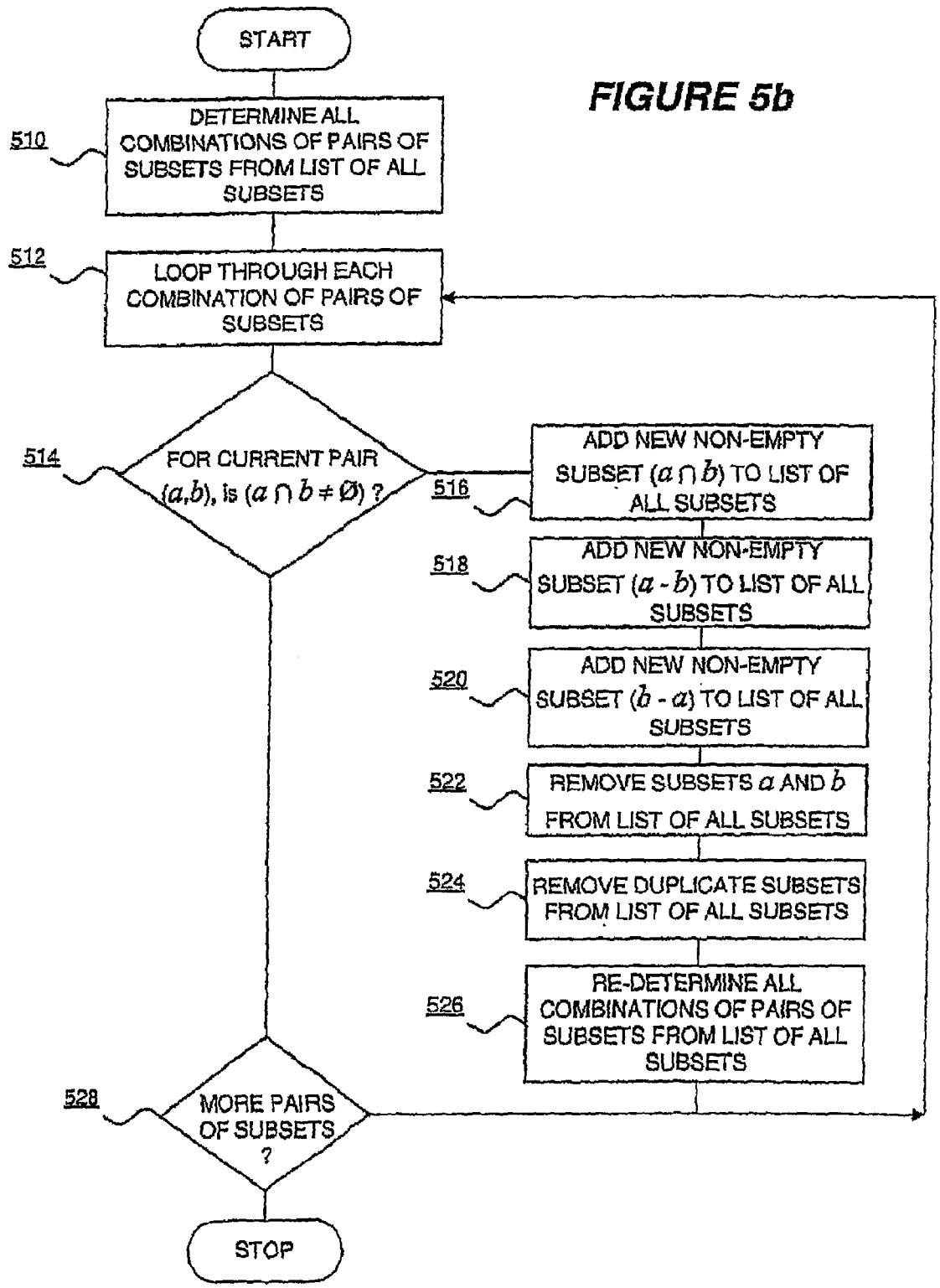
FIG. 5b is a flowchart illustrating a method for generating a list of disjoint subsets from a list of subsets in a preferred embodiment of the present invention.
Figure 6A:
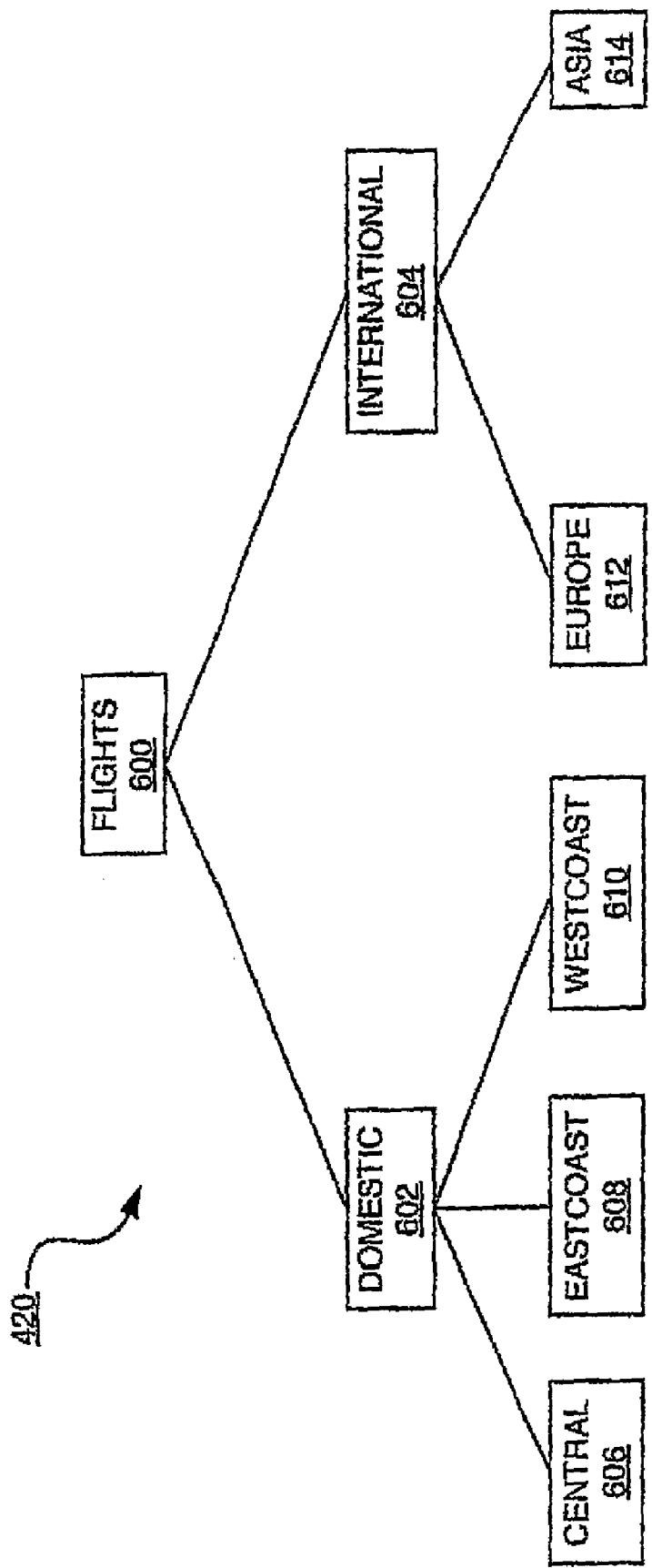
FIG. 6a is an illustrative example of the hierarchical information aggregate of FIG. 4a in accordance with a preferred embodiment of the present invention.

A method for defining the partition elements 468 is provided in FIG. 5*a*, and will be now considered with reference to the hierarchical information aggregate 420 of FIG. 6*a* and the access control list 460 defined in Tables 2a and 2b above.

Figure 6B:
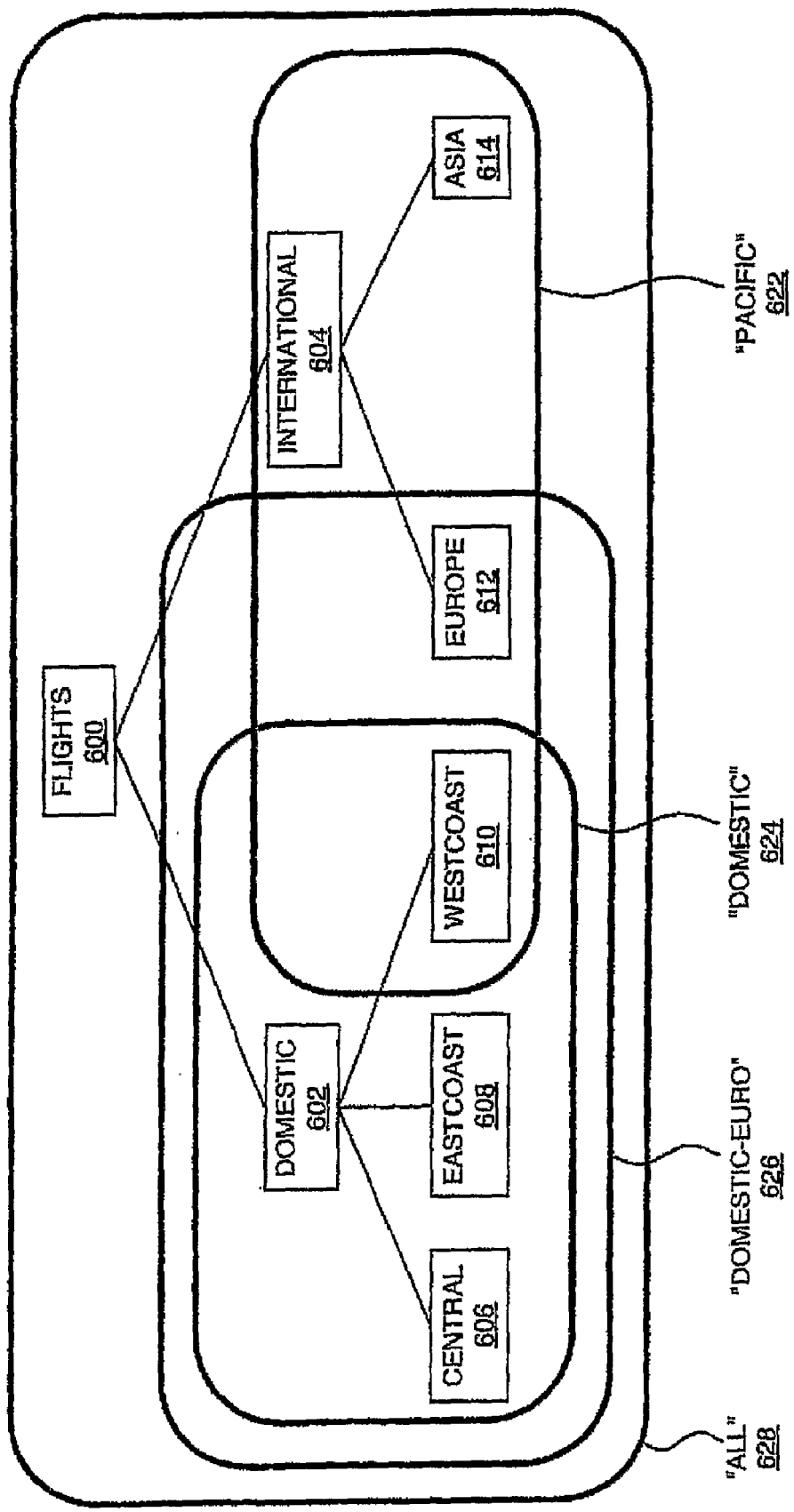
FIG. 6b is an schematic diagram illustrating the access control list of FIG. 4a and the hierarchical information aggregate of FIG. 6a in accordance with a preferred embodiment of the present invention.

Considering first step 502 of the method of FIG. 5*a*, subsets of the hierarchical information aggregate 420 are defined in accordance with the access control list 460. To illustrate this in practice, FIG. 6*b* depicts the hierarchical information aggregate of FIG. 6*a* with the subsets defined in Table 2a of the access control list 460 indicated using bold lines. Table 2a defines four roles 4602, each role comprising a subset of the hierarchical information aggregate 420. It can be seen from FIG. 6*b* that the role "PACIFIC" 622 defines a subset which includes the topics "INTERNATIONAL" 604, "WESTCOAST" 610, "EUROPE" 612 and "ASIA" 614. Also, the role "DOMESTIC" 624 defines a subset of the hierarchical information aggregate which includes the topics "DOMESTIC" 602, "CENTRAL" 606, "EASTCOAST" 608, "WESTCOAST" 610. Similarly, the roles "DOMESTIC-EURO" 626 and "ALL" 628 define subsets of the hierarchical information aggregate 420. It can also be seen that the subsets defined by the roles 4602 intersect each other and so do not, at this stage, form disjoint subsets.

Considering now step 504 of the method of FIG. 5*a*, the subsets corresponding to the roles 4602 in the access control list 460 are used to partition the hierarchical information aggregate 420 into disjoint proper subsets. The disjoint proper subsets correspond to partition elements 468. FIG. 6*c* illustrates the hierarchical information aggregate 420 partitioned into partition elements 468. Each element is a disjoint subset deriving from an intersect or set difference of the subsets of FIG. 6*b*. A detailed method for generating a list of disjoint subsets is considered below with respect to FIGS. 5*b* and 5*c*. There are five partition elements 468: partition element "L" 4680; partition element "M" 4682; partition element "N" 4684; partition element "O" 4686; and partition element "P" 4688. Table 3 below provides a definition of each of the partition elements 468 using set notation following the method of FIG. 5*a*.

TABLE 3

Partition Elements 468

| PARTITION ELEMENT | PARTITION ELEMENT DEFINITION |
|---|---|
| Partition element "L" 4680 | {FLIGHTS} |
| Partition element "M" 4682 | {FLIGHTS/DOMESTIC, FLIGHTS/DOMESTIC/CENTRAL, FLIGHTS/DOMESTIC/EASTCOAST} |
| Partition element "N" 4684 | {FLIGHTS/DOMESTIC/WESTCOAST} |
| Partition element "O" 4686 | {FLIGHTS/INTERNATIONAL/EUROPE} |
| Partition element "P" 4688 | {FLIGHTS/INTERNATIONAL, FLIGHTS/INTERNATIONAL/ASIA} |

Thus it can be seen that the partition elements "L" 4680 to "P" 4688 are disjoint proper subsets of the hierarchical information aggregate 420 as no two partition elements intersect and the union of all partition elements contains all topics in the hierarchical information aggregate 420. It is desirable for the information aggregate partitioner 462 to generate the partition elements 468 whenever the access control list 460 is changed. This ensures that the partition elements 468 accurately reflect the access control list 460.

FIG. 5b is a flowchart illustrating a method for generating a list of disjoint subsets from a list of subsets in a preferred embodiment of the present invention. For example, the method of FIG. 5b can be used to generate a list of disjoint subsets of topics in the hierarchical information hierarchy 420 from a list of roles, where each role defines a subset of the hierarchy. The method of FIG. 5b will now be described in use with reference to a further, simpler, example of the hierarchical information aggregate 420 illustrated in FIG. 5c. The hierarchical information aggregate 420 of FIG. 5c includes seven topics 550 to 560 arranged such that topic 550 is the root of the hierarchy. Topics 552 and 553 descend from topic 550. Topics 554 and 556 descend from topic 552, and topics 558 and 560 descend from topic 553. FIG. 5c further illustrates three subsets of the hierarchical information aggregate 420, such as roles 4602 of an access control list 460. A first subset I 570 includes all topics 552 to 560. A second subset j 572 includes topics 552, 554 and 556. A third subset k 574 includes topics 553, 558 and 560. A list of all subsets is summarised in Table 4a below for convenience.

TABLE 4a

List of All Subsets (of FIG. 5c)

| SUBSET | SUBSET DEFINITION |
|---|---|
| Subset i 570 | {550, 552, 553, 554, 556, 558, 560} |
| Subset j 572 | {552, 554, 556} |
| Subset k 574 | {554, 556, 558, 560} |

Considering now the method of FIG. 5b in use, at step 510 all combinations of pairs of subsets from the list of subsets in Table 4a above is determined. This, with the three subsets I 570, 7 572 and K 574, all combinations of pairs subsets can be summarised as outlined in Table 4b below. Each pair of subsets is specified in parentheses using the subset name.

TABLE 4b

All Combinations of Subsets

| Combination 1 | (i, j) |
| Combination 2 | (i, k) |
| Combination 3 | (j, k) |

Subsequently, at step 512, a loop is initiated through all combinations of pairs of subsets. Starting at combination 1 (i, j), step 514 determines if (i 3 j g Â). Using the definitions of subsets i 570 and j 572 in table 4a, it can be seen that:

i 3 j={552, 554, 556} and thus it is true that (i 3 j g Â) and the method proceeds to step 516. At step 516, a new subset is added to the list of all subsets (we shall call it subset l), where the new subset corresponds to (i 3 j). Thus, new subset l is defined as {552, 554, 556}. Further, at step 518, a new subset is added to the list of all subsets (we shall call it subset m), where the new subset corresponds to (i-j). Thus, new subset m is defined as {550, 553, 558, 560}. Further, at step 520, a new subset is added to the list of all subsets (we shall call it subset n), where the new subset corresponds to (j-i). Thus, new subset n is defined as {552, 554, 556}. Thus, steps 516 to 520 result in the three new subsets l, m and n being added to the list of subsets in Table 4a. At step 522, the subsets i 570 and j 572 are removed from the list of all subsets. Thus, at this step, the list of all subsets is as defined in Table 4c below.

| SUBSET | SUBSET DEFINITION |
|---|---|
| Subset k 574 | {554, 556, 558, 560} |
| Subset l | {552, 554, 556} |
| Subset m | {550, 553, 558, 560} |
| Subset n | {552, 554, 556} |

Subsequently, at step 524, duplicate subsets are removed from the list of all subsets. The list of all subsets includes subsets l and n which are both defined to be {552, 554, 556} and are thus duplicates. Subset n is therefore removed from the list of all subsets at step 524. At this step, the list of all subsets is as defined in Table 4d below.

TABLE 4d

List of All Subsets

| SUBSET | SUBSET DEFINITION |
|---|---|
| Subset k 574 | {554, 556, 558, 560} |
| Subset l | {552, 554, 556} |
| Subset m | {550, 553, 558, 560} |

At step 526 all combinations of pairs of subsets is re-determined in the light of the new list of all subsets. Table 4e provides a new list of all combinations of pairs of subsets. The method then returns to step 512 to loop through a next pair of subsets.

TABLE 4e

All Combinations of Subsets

| Combination 1 | (k, l) |
| Combination 2 | (k, m) |
| Combination 3 | (l, m) |

At step 512, a next pair of subsets is selected for processing from the list of combinations of pairs subsets. Since the list of combinations of pairs of subsets has been updated, the next pair of subsets for processing is the new first combination in the list, i.e. (k, l). Step 514 determines if (k 3 l g Â). Using the definitions of subsets k 574 and l in table 4d, it can be seen that:

k 3 l={554, 556} and thus it is true that (k 3 l g Â) and the method proceeds to step 516. At step 516, a new subset is added to the list of all subsets (we shall call it subset o), where the new subset corresponds to (k 3 l). Thus, new subset o is defined as {554, 556}. Further, at step 518, a new subset is added to the list of all subsets (we shall call it subset p), where the new subset corresponds to (k-l). Thus, new subset p is defined as {558, 560}. Further, at step 520, a new subset is added to the list of all subsets (we shall call it subset q), where the new subset corresponds to (l-k). Thus, new subset q is defined as {552}. Thus, steps 516 to 520 result in the three new subsets o, p and q being added to the list of subsets in Table 4d. At step 522, the subset k 574 and subset l are removed from the list of all subsets. Thus, at this step, the list of all subsets is as defined in Table 4c below.

TABLE 4f

List of All Subsets

| SUBSET | SUBSET DEFINITION |
|---|---|
| Subset m | {550, 553, 558, 560} |
| Subset o | {554, 556} |
| Subset p | {558, 560} |
| Subset q | {552} |

Subsequently, at step 524, duplicate subsets are removed from the list of all subsets. The list of all subsets does not include any duplicates so the method proceeds to step 526 where all combinations of pairs of subsets is re-determined in the light of the new list of all subsets. Table 4g provides a new list of all combinations of pairs of subsets. The method then returns to step 512 to loop through a next pair of subsets.

TABLE 4g

All Combinations of Subsets

| Combination 1 | (m, o) |
|---|---|
| Combination 2 | (m, p) |
| Combination 3 | (m, q) |
| Combination 4 | (o, p) |
| Combination 5 | (o, q) |
| Combination 6 | (p, q) |

At step 512, a next pair of subsets is selected for processing from the list of combinations of pairs subsets. Since the list of combinations of pairs of subsets has been updated, the next pair of subsets for processing is the new first combination in the list, i.e. (m, o). Step 514 determines if (m 3 o g Â). Using the definitions of subsets m and o in table 4f, it can be seen that:

m 3 o={ }=Â and thus (k 3 1 g Â) is false. The method consequently proceeds to step 528 where it is determined that there are more combinations of pairs of subsets to be processed. Processing returns to step 512 for a next pair of subsets, (m, p). Step 514 determines if (m 3 p g A). Using the definitions of subsets m and p in table 4f, it can be seen that:

m 3 p={558, 560} and thus it is true that (m 3 p g Â) and the method proceeds to step 516. At step 516, a new subset is added to the list of all subsets (we shall call it subset r), where the new subset corresponds to (m 3 p). Thus, new subset r is defined as {558, 560}. Further, at step 518, a new subset is added to the list of all subsets (we shall call it subset s), where the new subset corresponds to (m-p). Thus, new subset s is defined as {550, 553}. Further, at step 520, a new subset is added to the list of all subsets (we shall call it subset t), where the new subset corresponds to (p-m). Thus, new subset t is defined as { }. Subset t is an empty set and is therefore not added to the list of all subsets. Thus, steps 516 to 520 result in the two new subsets r and s being added to the list of subsets in Table 4f. At step 522, the subset m and subset p are removed from the list of all subsets. Thus, at this step, the list of all subsets is as defined in Table 4h below.

TABLE 4h

List of All Subsets

| SUBSET | SUBSET DEFINITION |
|---|---|
| Subset o | {554, 556} |
| Subset q | {552} |

TABLE 4h-continued

List of All Subsets

| SUBSET | SUBSET DEFINITION |
|---|---|
| Subset r | {558, 560} |
| Subset s | {550, 553} |

Subsequently, at step 524, duplicate subsets are removed from the list of all subsets. The list of all subsets does not include any duplicates so the method proceeds to step 526 where all combinations of pairs of subsets is re-determined in the light of the new list of all subsets. Table 4i provides a new list of all combinations of pairs of subsets. The method then returns to step 512 to loop through a next pair of subsets.

TABLE 4i

All Combinations of Subsets

| Combination 1 | (o, q) |
|---|---|
| Combination 2 | (o, r) |
| Combination 3 | (o, s) |
| Combination 4 | (q, r) |
| Combination 5 | (q, s) |
| Combination 6 | (r, s) |

At step 512, a next pair of subsets is selected for processing from the list of combinations of pairs subsets. Since the list of combinations of pairs of subsets has been updated, the next pair of subsets for processing is the new first combination in the list, i.e. (o, q). Step 514 determines if (o 3 q g Â). Using the definitions of subsets o and q in table 4h, it can be seen that:

o 3 q={ }=Â and thus (o 3 q g Â) is false. The method consequently proceeds to step 528 where it is determined that there are more combinations of pairs of subsets to be processed. Processing returns to step 512 for a next pair of subsets, (o, r). Step 514 determines if (o 3 r g Â). Using the definitions of subsets o and r in table 4h, it can be seen that:

o 3 r={ }=Â and thus (o 3 r g Â) is false. The method proceeds in this way processing all combinations of pairs of subsets finding that each combination does not intersect. Once all combinations are processed, step 528 then terminates the method.

Thus the method of FIG. 5*b* generates the list of all subsets in Table 4h which is a list of disjoint proper subsets. It is these disjoint proper subsets which correspond to partition elements in a preferred embodiment of the present invention. FIG. 5*d* illustrates the disjoint proper subsets generated using the method of FIG. 5*b*.

Returning now to FIG. 4*a*, the information provider 402 further includes a partition element key generator 470. The partition element key generator 470 is a hardware or software device or entity for generating partition element keys 472. Partition element keys 472 are encryption keys, such as public keys and private keys required for public/private key encryption. Each of the partition element keys 472 corresponds to one of the partition elements 468. An example of a partition element key generator 470 is the "Pretty Good Privacy" (PGP) product (Pretty Good Privacy at and PGP are registered trademarks of PGP Corporation). Table 6 below illustrates the partition element keys 472 for the partition elements 468 defined above with respect to FIG. 6*c* and Table 3.

TABLE 5

Partition Element Keys 472

| PARTITION ELEMENT | PARTITION ELEMENT KEY |
|---|---|
| Partition element "L" 4680 | Key $K_L$ 4720 |
| Partition element "M" 4682 | Key $K_M$ 4722 |
| Partition element "N" 4684 | Key $K_N$ 4724 |
| Partition element "O" 4686 | Key $K_O$ 4726 |
| Partition element "P" 4688 | Key $K_P$ 4728 |

Thus a partition element key $K_L$ 4720 is associated with the partition element "L" 4680. A partition element key $K_M$ 4722 is associated with the partition element "M" 4682 and so on. The partition element key generator 470 generates the partition element keys 472 when the partition elements 468 are first created by the information aggregate partitioner 462. Alternatively, a partition element key can be generated for a particular partition element when a first user subscribes to a topic in the partition element. This has the advantage of avoiding the generation of keys for a partition element when no user subscribes to any of the topics in the partition element. Additionally, changes to the access control list 460 may result in changes to the partition elements 468. When one of the partition element 468 changes (such as through the inclusion of addition topics into a partition element, or a exclusion of topics from a partition element) it is desirable to regenerate the corresponding partition element key 472. The regeneration of a partition element key is preferable to prevent a user who is newly authorised, through the access control list 460, to access information published to a particular topic from decrypting previously transmitted multicast messages. Further, the regeneration of a topic key is preferable to prevent users who is newly unauthorised, through the access control list 460, from continuing to decrypt future multicast messages.

Figure 7A:
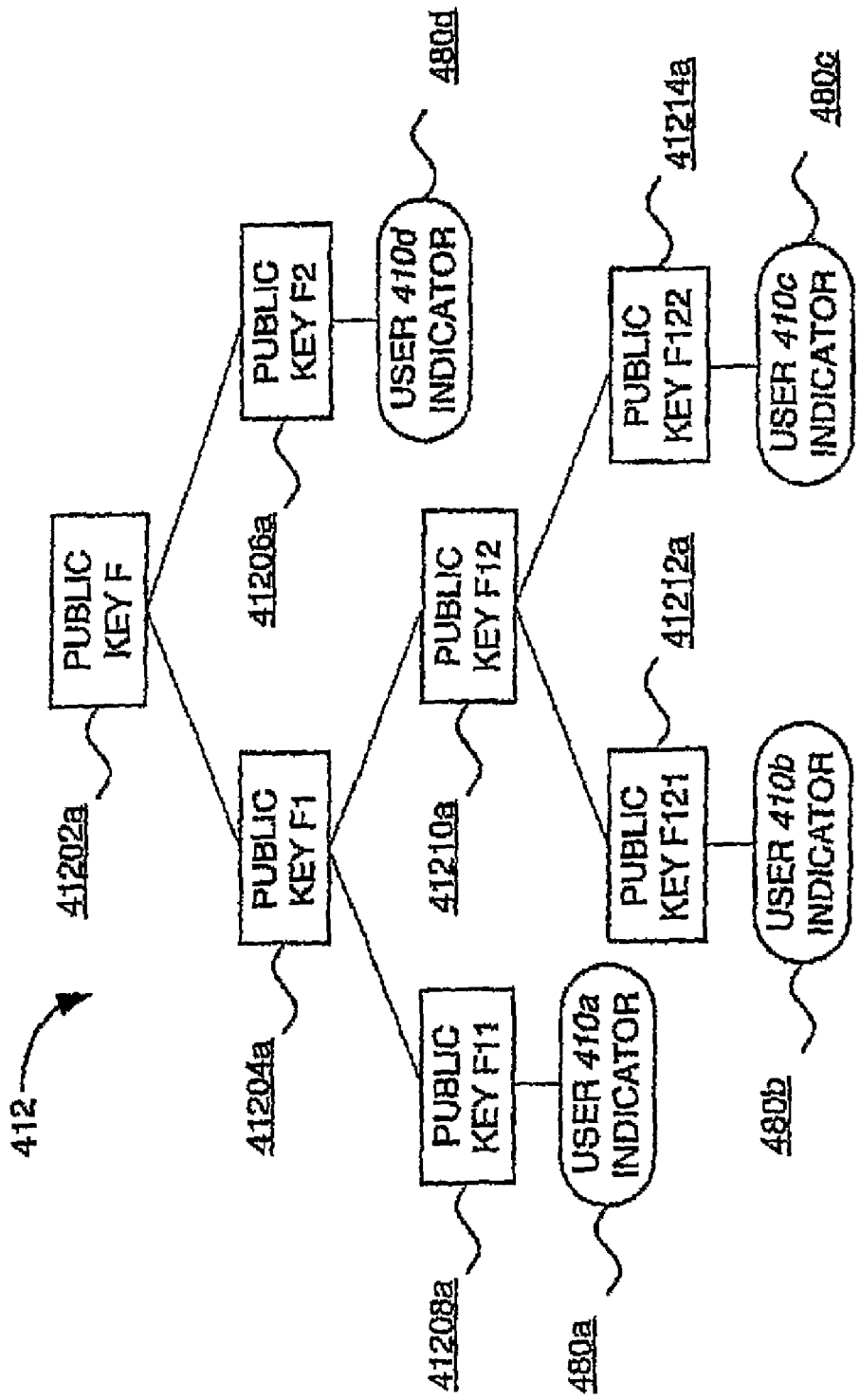
FIG. 7a is an illustrative example of the logical key hierarchy of FIG. 4a in accordance with a preferred embodiment of the present invention.

Returning to FIG. 4a, the information provider 402 further includes a logical key hierarchy 412 equivalent to that of FIG. 1a. In the preferred embodiment of the present invention the logical key hierarchy is used to securely communicate partition element keys 472 to authorised users in the multicast audience 408. FIG. 7a is an illustrative example of the logical key hierarchy 412 of FIG. 4a. The logical key hierarchy 412 is a logical tree structure of public encryption keys for use in public/private key encryption. A public key F 41202a is at the root of the logical key hierarchy 412. Directly descending from public key F 41202a are public keys F1 41204a and F2 41206a. Directly descending from public key F1 41204a are public keys F11 41208a and F12 41210a. Directly descending from public key F12 41210a are public keys F121 41212a and F122 41214a. The logical key hierarchy 412 includes an indicator for each of the users 410a to 410d. Each indicator is associated with a 'leaf' key in the logical tree structure. Indicator 480a corresponds to user 410a and is associated with public key F11 41208a. Indicator 480b corresponds to user 410b and is associated with public key F121 41212a, and so on.

Figure 7C:
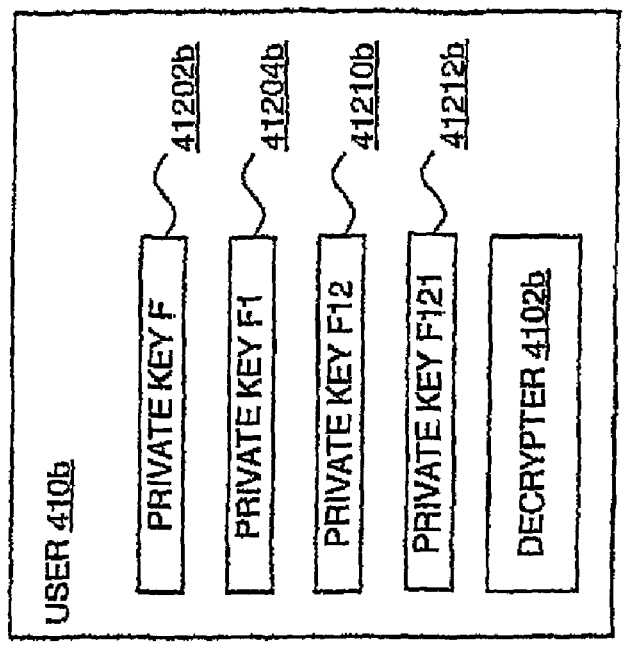
Figure 7B:
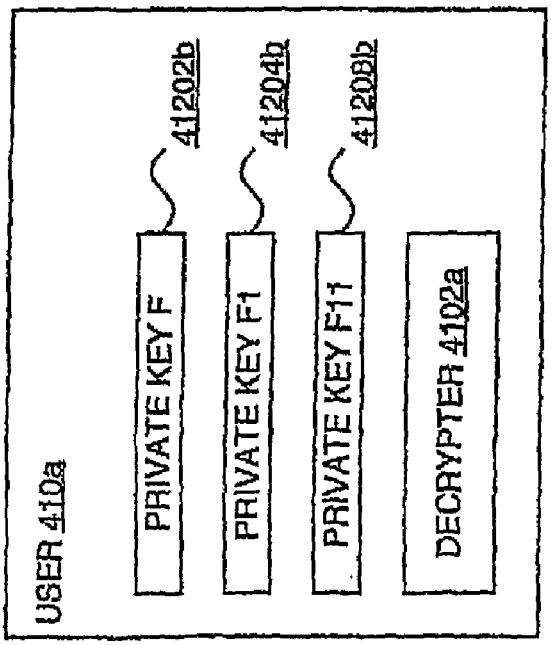

Each of the users 410a to 410d has access to private keys corresponding to each of the public keys in the path from the user's associated leaf key to the root of the logical key hierarchy 412. Considering first user 410a, FIG. 7b is an illustrative example of user 410a which is associated with public key F11 41208a in the logical key hierarchy 112 by way of the indicator 480a of FIG. 7a. User 410a has access to private keys corresponding to each of keys F 41202a, F1 41204a and F11 41208a because these keys are in the path from its associated leaf key to the root. User 410a therefore has access to: private key F 41202b corresponding to public key F 41202a; private key F1 41204b corresponding to public key F1 41204a; and private key F11 41208b corresponding to public key F11 41208a.

User 410a also includes a decrypter 4102a which is a hardware or software device or entity for generating a decrypted version of an encrypted data item using one or more decryption keys. For example, the decrypter 4120a can use a private decryption key such as private key F1 141208b to decrypt an item of data. An example of a decrypter 4102a is the "Pretty Good Privacy" (PGP) product.

Figure 7E:
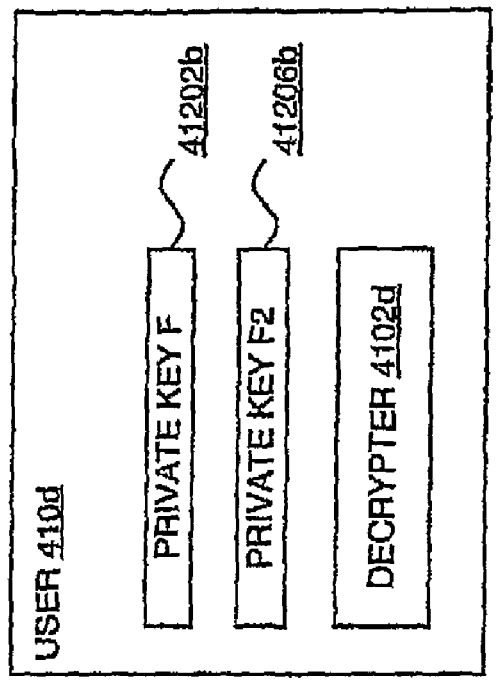
Figure 7D:
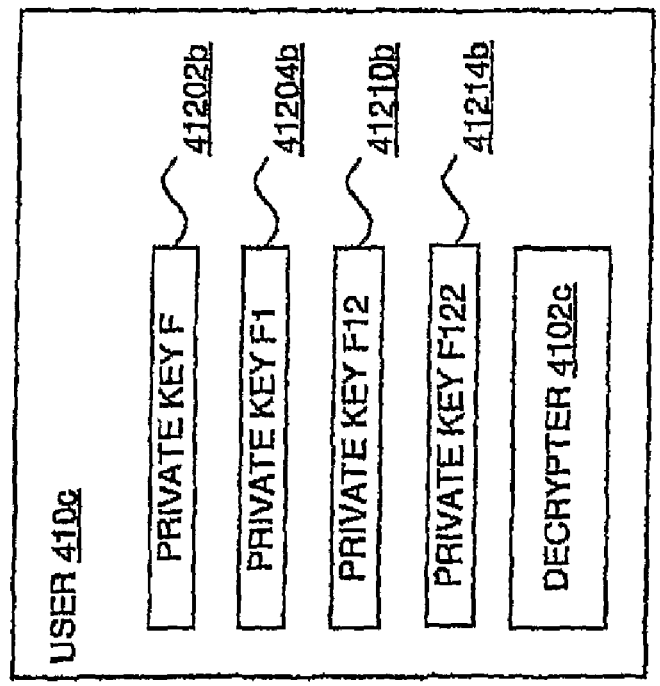

Users 410b to 410d similarly have access to private keys corresponding to each of the public keys in the path from each user's associated leaf key to the root of the logical key hierarchy 412. Corresponding illustrations of users 410b to 410d are provided in FIGS. 7c to 7e. It should be noted that, in this exemplary embodiment, each of users 410a to 410d have access to private key F 41202b corresponding to public key F 41202a in the logical key hierarchy 412. Thus, data encrypted by the information provider 402 using public key F 41202a can be decrypted by all of users 410a to 410d. Similarly, other groups of users share common keys according to the logical key hierarchy 412. For example, users 410b and 410c both have access to private key F12 41210b, whilst no other user has access to private key F12 41210b. Thus, data encrypted by the information provider 402 using public key F12 41210a can only be decrypted by users 410b and 410c using corresponding private key F12 41210b. In this way the logical key hierarchy 412 can be used to distribute partition element keys 472 only to authorised users in the multicast audience 408.

FIG. 8 is a flow chart illustrating a method for publishing information in a multicast system in accordance with a preferred embodiment of the present invention. When one of the publishers 448a and 448b publishes information to a topic of the hierarchical information aggregate 420, the information provider 402 employs the method of FIG. 8 to multicast the information as a multicast message to the multicast audience 408. Initially at step 802 the information provider 402 determines which one of the partition elements 468 contains the topic to which the information is published. The determined partition element will have associated a key from the partition element keys 472. Subsequently, at step 804, the published information is encrypted as a multicast message using the partition element key for the determined partition element. At step 806 the partition element key is itself encrypted for authorised users using a public key from logical key hierarchy 412. Thus, the partition element key is encrypted such that only users authorised to access information published to the topic are able to decrypt the partition element key. This technique of using a logical key hierarchy is well known in the art and is described in detail in Wong et al. Finally, at step 808, the encrypted partition element key and the encrypted multicast message are communicated by the multicaster 452 to the multicast audience 408. In this way the published information is encrypted using a partition element key corresponding to a partition element which contains the topic to which the information is published. Thus, there is no need for a separate key for each topic in the hierarchical information aggregate 420.

The method of FIG. 8 will now be considered in use for the configuration of the hierarchical information aggregate 420 defined in FIG. 6a and the access control list 460 defined in Tables 2a and 2b above. The definition of partition elements 468 of FIG. 6c and Table 3 will also apply. Three scenarios will be considered in which information is published by publishers 448a and 448b. The three scenarios are outlined in Table 6 below.

TABLE 6

Scenarios

| SCENARIO | PUBLISHER | TOPIC |
|---|---|---|
| Scenario 1 | Publisher 448a | "EUROPE" 612 |
| Scenario 2 | Publisher 448b | "WESTCOAST" 610 |
| Scenario 3 | Publisher 448a | "ASIA" 614 |

Considering first the method of FIG. 8 for scenario 1. In scenario 1 publisher 448a publishes information to topic "EUROPE" 612. Initially at step 802 the information provider 402 determines which one of the partition elements 468 contains the topic to which the information is published. Referring to the definition of the partition elements in Table 3 the information provider 402 can determine that the topic "EUROPE" 612 resides in partition element "O" 4686. Further, from Table 5, partition element "O" 4686 has associated partition element key $K_O$ 4726. Subsequently, at step 804, the published information is encrypted as a multicast message using partition element key $K_O$ 4726. At step 806 the partition element key $K_O$ 4726 is itself encrypted for authorised users using a public key from logical key hierarchy 412. The information provider 402 can determine which users are authorised to access information published to the topic "EUROPE" 612 with reference to the access control list 460 defined in Tables 2a and 2b. From Table 2a it can be seen that topic "EUROPE" 612 is included in the role "PACIFIC" 622 (by way of "FLIGHTS/INTERNATIONAL/#"), the role "DOMESTIC-EURO" 626 (by way of "FLIGHTS/INTERNATIONAL/EUROPE") and the role "ALL" 628 (by way of "FLIGHTS/#"). Thus, users belonging to these roles are authorised to access information published to the topic "EUROPE" 612. From Table 2b it can be seen that user 410b is a member of the role "PACIFIC" 622, and user 410c is a member of the role "DOMESTIC-EURO" 626. Thus, users 410b and 410c are authorised to access information published to the topic "EUROPE" 612. So, at step 806, a key from the logical key hierarchy 412 which is accessible to only users 410b and 410c is selected to encrypt the partition element key $K_O$ 4726. From FIGS. 7a to 7e it can be seen that public key F12 41210a is appropriate, as only users 410b and 410c have a corresponding private key F12 41210b. Partition element key $K_O$ 4726 is therefore encrypted by the information provider 402 using the public key F12 41210a. Finally, at step 808, the encrypted partition element key $K_O$ 4726 and the encrypted multicast message are communicated by the multicaster 452 to the multicast audience 408. In this way, the encrypted partition element key $K_O$ 4726 is only accessible to authorised users 410b and 410c, and thus only these users can decrypt the multicast message containing the published information.

Considering next the method of FIG. 8 for scenario 2. In scenario 2 publisher 448b publishes information to topic "WESTCOAST" 610. Initially at step 802 the information provider 402 determines which one of the partition elements 468 contains the topic to which the information is published. Referring to the definition of the partition elements in Table 3 the information provider 402 can determine that the topic "WESTCOAST" 610 resides in partition element "N" 4684. Further, from Table 5, partition element "N" 4684 has associated partition element key $K_N$ 4724. Subsequently, at step 804, the published information is encrypted as a multicast message using partition element key $K_N$ 4724. At step 806 the partition element key $K_N$ 4724 is itself encrypted for authorised users using a public key from logical key hierarchy 412. The information provider 402 can determine which users are authorised to access information published to the topic "WESTCOAST" 610 with reference to the access control list 460 defined in Tables 2a and 2b. From Table 2a it can be seen that topic "WESTCOAST" 610 is included in the role "PACIFIC" 622 (by way of "FLIGHTS/DOMESTIC/WESTCOAST"), the role "DOMESTIC-EURO" 626 (by way of "FLIGHTS/DOMESTIC/#"), the role "DOMESTIC" 624 (by way of "FLIGHTS/DOMESTIC/#") and the role "ALL" 628 (by way of "FLIGHTS/#"). Thus, users belonging to these roles are authorised to access information published to the topic "WESTCOAST" 610. From Table 2b it can be seen that user 410a is a member of the role "DOMESTIC" 624, user 410b is a member of the role "PACIFIC" 624 and user 410c is a member of the role "DOMESTIC-EURO" 626. Thus, users 410a, 410b and 410c are authorised to access information published to the topic "WESTCOAST" 610. So, at step 806, a key from the logical key hierarchy 412 which is accessible to only users 410a, 410b and 410c is selected to encrypt the partition element key $K_N$ 4724. From FIGS. 7a to 7e it can be seen that public key F1 41204a is appropriate, as only users 410a, 410b and 410c have a corresponding private key F1 41204b. Partition element key $K_N$ 4724 is therefore encrypted by the information provider 402 using the public key F1 41204a. Finally, at step 808, the encrypted partition element key $K_N$ 4724 and the encrypted multicast message are communicated by the multicaster 452 to the multicast audience 408. In this way, the encrypted partition element key $K_N$ 4724 is only accessible to authorised users 410a, 410b and 410c, and thus only these users can decrypt the multicast message containing the published information.

Considering next the method of FIG. 8 for scenario 3. In scenario 3 publisher 448a publishes information to topic "ASIA" 614. Initially at step 802 the information provider 402 determines which one of the partition elements 468 contains the topic to which the information is published. Referring to the definition of the partition elements in Table 3 the information provider 402 can determine that the topic "ASIA" 614 resides in partition element "P" 4688. Further, from Table 5, partition element "P" 4688 has associated partition element key $K_P$ 4728. Subsequently, at step 804, the published information is encrypted as a multicast message using partition element key $K_P$ 4728. At step 806 the partition element key $K_P$ 4728 is itself encrypted for authorised users using a public key from logical key hierarchy 412. The information provider 402 can determine which users are authorised to access information published to the topic "ASIA" 614 with reference to the access control list 460 defined in Tables 2a and 2b. From Table 2a it can be seen that topic "ASIA" 614 is included in the role "PACIFIC" 622 (by way of "FLIGHTS/INTERNATIONAL/#") and the role "ALL" 628 (by way of "FLIGHTS/#"). Thus, users belonging to these roles are authorised to access information published to the topic "ASIA" 614. From Table 2b it can be seen that user 410b is a member of the role "PACIFIC" 622. Thus, user 410b is authorised to access information published to the topic "ASIA" 614. So, at step 806, a key from the logical key hierarchy 412 which is accessible to only user 410b is selected to encrypt the partition element key $K_P$ 4728. From FIGS. 7a to 7e it can be seen that public key F121 41212a is appropriate, as only user 410b has a corresponding private key F121 41212b. Partition element key $K_P$ 4728 is therefore encrypted by the information provider 402 using the public key F121 41212a. Finally, at step 808, the encrypted partition element key $K_P$ 4728 and the encrypted multicast message are communicated by the multicaster 452 to the multicast audience 408. In this way, the encrypted partition element key $K_P$ 4728 is only accessible to authorised user 410*b* and thus only this user can decrypt the multicast message containing the published information.

Thus, where an access control list 460 is provided, keys can be assigned to groups of topics as partition elements 468 rather than to each individual topic. In this way it is not necessary to assign a key to each topic unless the granularity of access control requires it (i.e. unless access control is defined on a per-topic basis).

The invention claimed is:

1. A multicast host for communicating information published about any one topic of a set of topics to one or more authorized subscribers to those topics, the set of topics being partitioned into one or more partition elements, each partition element having a partition element encryption key associated therewith, wherein each of the one or more partition elements is a disjoint proper subset of the set of topics in which no two partition elements intersect, the host comprising:
    means for receiving information relating to a root topic, wherein the root topic is depicted as a root node in a topic hierarchical tree;
    means for determining a partition element for the root topic, wherein the partition element is depicted in the topic hierarchical tree as a topic leaf in the topic hierarchical tree, and wherein the partition element is part of a group identified and defined by the root topic;
    means for retrieving a partition element encryption key associated with the partition element, wherein each partition element encryption key is unique for a specific partition element, wherein the partition element encryption key is depicted as a key leaf on a key hierarchical tree, and wherein each node in the key hierarchical tree matches a corresponding topic leaf in the topic hierarchical tree;
    means for encrypting the information with a retrieved partition element encryption key;
    means for communicating the information to the one or more authorized subscribers, wherein the one or more authorized subscribers have access to all represented keys for a group located in a path from the key leaf to a root of the key hierarchical tree;
    means for transmitting said all represented keys to said one or more authorized subscribers; and
    means for, in response to an identification of a topic changing and a new subscriber of the topic being added, generating a new topic key for the topic, wherein the new topic key replaces an old topic key for the topic, and wherein the old topic key is hidden from the new subscriber to prevent the new subscriber from decrypting previously transmitted multicast messages.

2. The multicast host of claim 1 wherein each disjoint proper subset of the set of topics is defined in accordance with an access control list.

3. The multicast host of claim 2 wherein the access control list includes a definition of a plurality of roles.

4. The multicast host of claim 3 wherein each of the plurality of roles is a subset of the set of topics.

5. The multicast host of claim 1, wherein the multicast host is an information provider computer system, and wherein the information provider computer system comprises an access control list for defining topics in a hierarchical information aggregate which users in a multicast audience are authorized to access, a topic key generator for generating encryption keys, and a topic key hierarchy database that includes a topic key associated with each subtopic in the topic hierarchical tree.

6. The multicast host of claim 1 further comprising means for:
    assigning a single key to a group of topics, wherein the group of topics are from the set of topics.

7. The multicast host of claim 6 wherein the partition element encryption key is securely communicated by encrypting the partition element encryption key.

8. The multicast host of claim 7 wherein the partition element encryption key is encrypted using a logical key hierarchy in which a logical key corresponds to the one or more authorized subscribers.

9. The multicast host of claim 1 further comprising:
    means for securely communicating a partition element decryption key to the one or more authorized subscribers, wherein the partition element decryption key corresponds to the partition element encryption key.

10. The multicast host of claim 9 wherein the partition element decryption key is securely communicated by encrypting the partition element decryption key.

11. The multicast host of claim 10 wherein the partition element decryption key is encrypted using a logical key hierarchy in which a logical key corresponds to the one or more authorized subscribers.

12. The multicast host of claim 1 further comprising:
    means for receiving a new subscription to a topic in a particular partition element; and
    means for generating a new partition element encryption key for the particular partition element.

13. The multicast host of claim 12 further comprising means for generating a new partition element decryption key corresponding to the new partition element encryption key.

14. The multicast host of claim 1 further comprising:
    means for receiving a cancelled subscription to a topic in a partition element; and
    means for generating a new partition element encryption key for a partition element.

15. The multicast host of claim 14 further comprising means for generating a new partition element decryption key corresponding to the new partition element encryption key.

16. A multicast system comprising:
    a multicast host according to claim 1; and
    one or more multicast subscribers for receiving information communicated by the multicast host.

17. The multicast system of claim 16 further comprising:
    one or more publishers for publishing information about any one of a plurality of topics.

18. A method for communicating information published about any one topic of a set of topics to one or more authorized subscribers to those topics, the set of topics being partitioned into one or more partition elements, each partition element having a partition element encryption key associated therewith, wherein each of the one or more partition elements is a disjoint proper subset of the set of topics in which no two partition elements intersect, the method comprising:
    receiving information relating to a root topic, wherein the root topic is depicted as a root node in a topic hierarchical tree;
    determining a partition element for the root topic, wherein the partition element is depicted in the topic hierarchical tree as a topic leaf in the topic hierarchical tree, and wherein the partition element is part of a group identified by the root topic wherein the partition element is a set of topics that are obtained by partitioning the topic;
    retrieving a partition element encryption key associated with the partition element, —wherein each partition element encryption key is unique for a specific partition element, wherein the partition element encryption key is depicted as a key leaf on a key hierarchical tree, and wherein each node in the key hierarchical tree matches a corresponding topic leaf in the topic hierarchical tree;

encrypting the information with a retrieved partition element encryption key;

communicating the information to the one or more authorized subscribers, wherein the one or more authorized subscribers have access to all represented keys for a group located in a path from the key leaf to a root of the key hierarchical tree;

transmitting said all represented keys to said one or more authorized subscribers; and in response to an identification of a topic changing and a new subscriber of the topic being added, a processor generating a new topic key for the topic, wherein the new topic key replaces an old topic key for the topic, and wherein the old topic key is hidden from the new subscriber to prevent the new subscriber from decrypting previously transmitted multicast messages.

19. The method of claim 18 wherein each disjoint proper subset of the set of topics is defined in accordance with an access control list.

20. The method of claim 18, further comprising:
assigning a single key to a group of topics, wherein the group of topics are from the set of topics.

21. The method claim 18, further comprising:
restricting a subscription to a topic to authorized users named on an access control list.

22. The method of claim 21 wherein the partition element encryption key is encrypted using a logical key hierarchy in which a logical key corresponds to the one or more authorized subscribers.

23. The method of claim 18 further comprising securely communicating a partition element decryption key to the one or more authorized subscribers, wherein the partition element decryption key corresponds to the partition element encryption key.

24. The method of claim 23 wherein the partition element decryption key is securely communicated by encrypting the partition element decryption key.

25. The method of claim 24 wherein the partition element decryption key is encrypted using a logical key hierarchy in which a logical key corresponds to the one or more authorized subscribers.

26. The method of claim 18 further comprising:
receiving a new subscription to a topic in a particular partition element; and
generating a new partition element encryption key for the particular partition element.

27. The method of claim 26 further comprising:
generating a new partition element decryption key corresponding to the new partition element encryption key.

28. The method of claim 18 further comprising:
receiving a cancelled subscription to a topic in a particular partition element; and
generating a new partition element encryption key for the particular partition element.

29. The method of claim 28 further comprising generating a new partition element decryption key corresponding to the new partition element encryption key.

30. A non-transitory computer readable storage medium on which is stored a computer program comprising computer program code which, when executed on a data processing system, instructs the data processing system to carry out the method as claimed in claim 18.

31. A computer program product stored on a non-transitory computer usable storage medium, the computer program product for communicating information published about any one topic of a set of topics to one or more authorized subscribers to those topics, the set of topics being partitioned into one or more partition elements, each partition element having a partition element encryption key associated therewith, wherein each of the one or more partition elements is a disjoint proper subset of the set of topics, wherein no two partition elements of the one or more partition elements intersect, the computer program product comprising:

computer readable program means for receiving information relating to a root topic, wherein the root topic is depicted as a root node in a topic hierarchical tree;

computer readable program means for determining a partition element for the root topic, wherein the partition element is depicted in the topic hierarchical tree as a topic leaf in the topic hierarchical tree, and wherein the partition element is part of a group identified by the root topic;

computer readable program means for retrieving a partition element encryption key associated with the partition element, wherein each partition element encryption key is unique for a specific partition element, wherein the partition element encryption key is depicted as a key leaf on a key hierarchical tree, and wherein each node in the key hierarchical tree matches a corresponding topic leaf in the topic hierarchical tree;

computer readable program means for encrypting the information with a retrieved partition element encryption key;

computer readable program means for communicating the information to the one or more authorized subscribers, wherein the one or more authorized subscribers have access to all represented keys for a group located in a path from the key leaf to a root of the key hierarchical tree; and computer readable program means for, in response to an identification of a topic changing and a new subscriber of the topic being added, generating a new topic key for the topic, wherein the new topic key replaces an old topic key for the topic, and wherein the old topic key is hidden from the new subscriber to prevent the new subscriber from decrypting previously transmitted multicast messages.

32. A multicast host for communicating information published about any one of a plurality of topics to one or more authorized subscribers to those topics, each topic having a topic encryption key associated therewith, the multicast host comprising:

means for receiving information relating to a root topic, wherein the root topic is depicted as a root node in a topic hierarchical tree;

means for determining a partition element for the root topic, wherein the partition element is depicted in the topic hierarchical tree as a topic leaf in the topic hierarchical tree, and wherein the partition element is part of a group identified and defined by the root topic;

means for retrieving a partition element encryption key associated with the partition element, wherein each partition element encryption key is unique for a specific partition element, wherein the partition element encryption key is depicted as a key leaf on a key hierarchical tree, and wherein each node in the key hierarchical tree matches a corresponding topic leaf in the topic hierarchical tree;

means for encrypting the information with a retrieved partition element encryption key;

means for communicating the information to the one or more authorized subscribers, wherein the one or more authorized subscribers have access to all represented keys for a group located in a path from the key leaf to a root of the key hierarchical tree;

means for transmitting said all represented keys to said one or more authorized subscribers;

means for, in response to an identification of a topic changing and a new subscriber of the topic being added, generating a new topic key for the topic, wherein the new topic key replaces an old topic key for the topic, and wherein the old topic key is hidden from the new subscriber to prevent the new subscriber from decrypting previously transmitted multicast messages;

means for accessing subscriber data representing one or more users subscribed to multiple subtopics related to the root topic;

means for retrieving a different topic encryption key associated with each of the plurality of topics;

means for encrypting the information with each said different retrieved topic encryption key; and means for communicating the information to the one or more users.

33. The multicast host of claim 32 further comprising means for securely communicating the topic encryption key to the one or more users.

34. The multicast host claim 33 wherein the topic encryption key is securely communicated by encrypting the topic encryption key.

35. The multicast host of claim 34 wherein the topic encryption key is encrypted using a logical key hierarchy in which a logical key corresponds to the one or more users.

36. The multicast host of claim 32 further comprising means for securely communicating a topic decryption key to the one or more subscribers, wherein the topic decryption key corresponds to the topic encryption key.

37. The multicast host of claim 36 wherein the topic decryption key is securely communicated by encrypting the topic decryption key.

38. The multicast host of claim 37 wherein the topic decryption key is encrypted using a logical key hierarchy in which a logical key corresponds to the one or more users.

39. The multicast host of claim 32 further comprising:
means for receiving a new subscription to a topic; and
means for generating a new topic encryption key for the topic.

40. The multicast host of claim 39 further comprising means for generating a new topic decryption key corresponding to the new topic encryption key.

41. The multicast host of claim 32 further comprising:
means for receiving information relating to a new topic; and
means for generating a new topic encryption key for the new topic.

42. The multicast host of claim 41 further comprising means for generating a topic decryption key corresponding to the new topic encryption key for the new topic.

43. The multicast host of claim 32 further comprising:
means for receiving a cancelled subscription to a topic; and
means for generating a new topic encryption key for the topic.

44. The multicast host of claim 43 further comprising means for generating a new topic decryption key corresponding to the new topic encryption key.

45. A multicast system comprising:
a multicast host according to claim 32; and
one or more multicast subscribers for receiving information communicated by the multicast host.

46. The multicast system of claim 45 further comprising:
one or more publishers for publishing information about any one of a plurality of topics.

47. A method for communicating information published about any one of a plurality of topics to one or more authorized subscribers to those topics, each topic having a topic encryption key associated therewith, the method comprising:
receiving information relating to a root topic, wherein the root topic is depicted as a root node in a topic hierarchical tree;
determining a partition element for the root topic, wherein the partition element is depicted in the topic hierarchical tree as a topic leaf in the topic hierarchical tree, and wherein the partition element is part of a group identified and defined by the root topic;
retrieving a partition element encryption key associated with the partition element, wherein each partition element encryption key is unique for a specific partition element, wherein the partition element encryption key is depicted as a key leaf on a key hierarchical tree, and wherein each node in the key hierarchical tree matches a corresponding topic leaf in the topic hierarchical tree;
encrypting, by a processor, the information with a retrieved partition element encryption key;
communicating the information to the one or more authorized subscribers, wherein the one or more authorized subscribers have access to all represented keys for a group located in a path from the key leaf to a root of the key hierarchical tree;
transmitting said all represented keys to said one or more authorized subscribers;
in response to an identification of a topic changing and a new subscriber of the topic being added, generating a new topic key for the topic, wherein the new topic key replaces an old topic key for the topic, and wherein the old topic key is hidden from the new subscriber to prevent the new subscriber from decrypting previously transmitted multicast messages;
accessing subscriber data representing one or more users subscribed to multiple subtopics related to the root topic;
retrieving a different topic encryption key associated with each of the plurality of topics, wherein none of the plurality of topics intersect;
encrypting the information with each said different retrieved topic encryption key, wherein each of the plurality of topics are individually encrypted;
assigning a single key to a group of encrypted topics, wherein the group of encrypted topics are from the plurality of topics that have each been individually encrypted, and
communicating said single key to decrypt the information to the one or more users.

48. The method of claim 47 further comprising securely communicating the topic encryption key to the one or more subscribers.

49. The method of claim 47, wherein the topic encryption key is securely communicated by encrypting the topic encryption key.

50. The method of claim 49 wherein the topic encryption key is encrypted using a logical key hierarchy in which a logical key corresponds to the one or more users.

51. The method of claim 47 further comprising securely communicating a topic decryption key to the one or more subscribers, wherein the topic decryption key corresponds to the topic encryption key.

52. The method of claim 51 wherein the topic decryption key is securely communicated by encrypting the topic decryption key.

53. The method of claim 52 wherein the topic decryption key is encrypted using a logical key hierarchy in which a logical key corresponds to the one or more users.

54. The method of claim 47 further comprising:
receiving a new subscription to a topic; and
generating a new topic encryption key for the topic.

55. The method of claim 54 further comprising generating a new topic decryption key corresponding to the new topic encryption key.

56. The method of claim 47 further comprising:
receiving information relating to a new topic; and
generating a new topic encryption key for the new topic.

57. The method of claim 56 further comprising generating a topic decryption key corresponding to the new topic encryption key for the new topic.

58. The method of claim 47 further comprising:
receiving a cancelled subscription to a topic; and
generating a new topic encryption key for the topic.

59. The method of claim 58 further comprising generating a new topic decryption key corresponding to the new topic encryption key.

60. A computer program product comprising computer program code stored on a non-transitory computer readable storage medium which, when executed on a data processing system, instructs the data processing system to carry out the method as claimed in claim 47.

61. A computer program product stored on a non-transitory computer usable storage medium, the computer program product for communicating information published about any one of a plurality of topics to one or more authorized subscribers to those topics, each topic having a topic encryption key associated therewith, the computer program product comprising:

computer readable program means for receiving information relating to a root topic, wherein the root topic is depicted as a root node in a topic hierarchical tree;

computer readable program means for determining a partition element for the root topic, wherein the partition element is depicted in the topic hierarchical tree as a topic leaf in the topic hierarchical tree, and wherein the partition element is part of a group identified and defined by the root topic;

computer readable program means for retrieving a partition element encryption key associated with the partition element, wherein each partition element encryption key is unique for a specific partition element, wherein the partition element encryption key is depicted as a key leaf on a key hierarchical tree, and wherein each node in the key hierarchical tree matches a corresponding topic leaf in the topic hierarchical tree;

computer readable program means for encrypting the information with the retrieved partition element encryption key;

computer readable program means for communicating the information to the one or more authorized subscribers, wherein the one or more authorized subscribers have access to all represented keys for a group located in a path from the key leaf to a root of the key hierarchical tree;

computer readable program means for transmitting said all represented keys to said one or more authorized subscribers;

computer readable program means for, in response to an identification of a topic changing and a new subscriber of the topic being added, generating a new topic key for the topic, wherein the new topic key replaces an old topic key for the topic, and wherein the old topic key is hidden from the new subscriber to prevent the new subscriber from decrypting previously transmitted multicast messages;

computer readable program means for accessing subscriber data representing one or more users subscribed to multiple subtopics related to the root topic;

computer readable program means for retrieving a different topic encryption key associated with each of the plurality of topics, wherein none of the plurality of topics intersect;

computer readable program means for encrypting the information with each said different retrieved topic encryption key; and computer readable program means for communicating the information to the one or more users.

* * * * *